US009667470B2

(12) United States Patent
Prathipati et al.

(10) Patent No.: US 9,667,470 B2
(45) Date of Patent: May 30, 2017

(54) FAILURE HANDLING IN THE EXECUTION FLOW OF PROVISIONING OPERATIONS IN A CLOUD ENVIRONMENT

(71) Applicant: Oracle International Corporation, Redwood Shores, CA (US)

(72) Inventors: Anjani Kalyan Prathipati, Union City, CA (US); Madhu Syamala, Rockville, MD (US); Sumit Chougule, Belmont, CA (US); Gopalan Arun, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 477 days.

(21) Appl. No.: 13/907,652

(22) Filed: May 31, 2013

(65) Prior Publication Data

US 2014/0075239 A1 Mar. 13, 2014

Related U.S. Application Data

(60) Provisional application No. 61/698,413, filed on Sep. 7, 2012, provisional application No. 61/698,459, filed (Continued)

(51) Int. Cl.
*H04L 29/14* (2006.01)
*H04L 29/08* (2006.01)

(52) U.S. Cl.
CPC .......... *H04L 29/14* (2013.01); *H04L 67/1097* (2013.01); *H04L 67/306* (2013.01)

(58) Field of Classification Search
CPC .................... G06F 11/3672; G06F 11/3692
See application file for complete search history.

(56) References Cited

U.S. PATENT DOCUMENTS 5,892,909 A 4/1999 Grasso et al.
5,911,143 A 6/1999 Deinhart et al.
(Continued)

FOREIGN PATENT DOCUMENTS

CN 104604201 5/2015
EP 0538464 A1 4/1993
(Continued)

OTHER PUBLICATIONS

Oracle—Breaking Cloud Security Barriers with Identity Management, Oracle, 2010, 37 pages.
(Continued)

*Primary Examiner* — Jigar Patel
(74) *Attorney, Agent, or Firm* — Kilpatrick Townsend & Stockton LLP

(57) ABSTRACT

A method for handling failures in the execution flow of provisioning operations is disclosed. The method may comprise receiving, by a cloud infrastructure system, an error from the execution flow of provisioning a service from a plurality of service provided by the cloud infrastructure system, the cloud infrastructure system comprising one or more computing devices. Additionally, the method may further comprise determining, by a computing device from the one or more computing devices, a specific service associated with the error and determining an error classification type associated with the error based on the specific service. Subsequently, the method may further comprise performing, by the computing device, a corrective action based on the specific service and the error type.

21 Claims, 16 Drawing Sheets

Related U.S. Application Data on Sep. 7, 2012, provisional application No. 61/794,427, filed on Mar. 15, 2013, provisional application No. 61/799,940, filed on Mar. 15, 2013, provisional application No. 61/785,299, filed on Mar. 14, 2013.

(56) References Cited

U.S. PATENT DOCUMENTS

| | | |
|---|---|---|
| 5,961,636 A | 10/1999 | Brooks et al. |
| 5,970,120 A | 10/1999 | Kasrai |
| 6,052,684 A | 4/2000 | Du |
| 6,085,188 A | 7/2000 | Bachmann et al. |
| 6,122,640 A | 9/2000 | Pereira |
| 6,192,391 B1 | 2/2001 | Ohtani et al. |
| 6,236,988 B1 | 5/2001 | Aldred |
| 6,397,125 B1 | 5/2002 | Goldring et al. |
| 6,516,416 B2 | 2/2003 | Gregg et al. |
| 6,526,513 B1 | 2/2003 | Shrader et al. |
| 6,546,095 B1 | 4/2003 | Iverson et al. |
| 6,553,364 B1 | 4/2003 | Wu |
| 6,611,506 B1 | 8/2003 | Huang et al. |
| 6,633,907 B1 | 10/2003 | Spencer et al. |
| 6,745,209 B2 | 6/2004 | Holenstein et al. |
| 6,970,889 B2 | 11/2005 | Flanagin et al. |
| 7,051,039 B1 | 5/2006 | Murthy et al. |
| 7,136,867 B1 | 11/2006 | Chatterjee et al. |
| 7,290,288 B2 | 10/2007 | Gregg et al. |
| 7,321,904 B2 | 1/2008 | Holenstein et al. |
| 7,409,413 B2 | 8/2008 | Martinez et al. |
| 7,428,503 B1 | 9/2008 | Groff et al. |
| 7,565,310 B2 | 7/2009 | Gao et al. |
| 7,664,866 B2 | 2/2010 | Wakefield |
| 7,783,746 B2 | 8/2010 | Hand et al. |
| 7,788,225 B2 | 8/2010 | Fish et al. |
| 7,912,930 B1 | 3/2011 | Farooqi et al. |
| 7,921,299 B1 | 4/2011 | Anantha et al. |
| 7,953,896 B2 | 5/2011 | Ward et al. |
| 7,974,943 B2 | 7/2011 | Gilbert et al. |
| 7,992,194 B2 | 8/2011 | Damodaran et al. |
| 8,095,629 B2 | 1/2012 | Ward et al. |
| 8,151,323 B2 | 4/2012 | Harris et al. |
| 8,156,083 B2 | 4/2012 | Banerjee et al. |
| 8,204,794 B1 | 6/2012 | Peng et al. |
| 8,254,396 B2 | 8/2012 | Appanna et al. |
| 8,291,490 B1 | 10/2012 | Ahmed et al. |
| 8,321,921 B1 | 11/2012 | Ahmed et al. |
| 8,370,303 B1 | 2/2013 | Ceschim et al. |
| 8,380,880 B2 | 2/2013 | Gulley et al. |
| 8,387,136 B2 | 2/2013 | Lee et al. |
| 8,387,137 B2 | 2/2013 | Lee et al. |
| 8,402,514 B1 | 3/2013 | Thompson et al. |
| 8,434,129 B2 | 4/2013 | Kannappan et al. |
| 8,499,005 B2 | 7/2013 | Brooks et al. |
| 8,515,907 B2 | 8/2013 | Burjoski |
| 8,572,027 B2 | 10/2013 | Parees et al. |
| 8,572,602 B1 | 10/2013 | Colton et al. |
| 8,626,717 B2 | 1/2014 | Bendakovsky et al. |
| 8,631,477 B2 | 1/2014 | Chen et al. |
| 8,631,478 B2 | 1/2014 | Chen et al. |
| 8,656,002 B1 | 2/2014 | Adogla et al. |
| 8,712,961 B2 | 4/2014 | Dwyer et al. |
| 8,738,775 B1 | 5/2014 | Adogla et al. |
| 8,769,622 B2 | 7/2014 | Chang et al. |
| 8,769,704 B2 | 7/2014 | Peddada et al. |
| 8,788,457 B2 | 7/2014 | Parees et al. |
| 8,788,663 B1 | 7/2014 | Adogla et al. |
| 8,789,157 B2 | 7/2014 | Sinn |
| 8,806,593 B1 | 8/2014 | Raphel et al. |
| 8,843,997 B1 | 9/2014 | Hare |
| 8,849,685 B2 | 9/2014 | Oden |
| 8,856,077 B1 | 10/2014 | Roth et al. |
| 8,949,178 B2 | 2/2015 | Zhao et al. |
| 9,015,114 B2 | 4/2015 | Chatterjee et al. |
| 9,203,866 B2 | 12/2015 | Chatterjee et al. |
| 9,244,953 B2 | 1/2016 | Vingralek et al. |
| 9,253,113 B2 | 2/2016 | Vasudevan et al. |
| 9,319,269 B2 | 4/2016 | Arun et al. |
| 9,397,884 B2 | 7/2016 | Chatterjee et al. |
| 2002/0007363 A1 | 1/2002 | Vaitzblit |
| 2002/0059210 A1 | 5/2002 | Makus et al. |
| 2002/0156664 A1 | 10/2002 | Willcox et al. |
| 2003/0046342 A1 | 3/2003 | Felt et al. |
| 2003/0212991 A1 | 11/2003 | Mahajan |
| 2003/0233465 A1* | 12/2003 | Le et al. ............... 709/231 |
| 2004/0022379 A1 | 2/2004 | Klos et al. |
| 2004/0066930 A1 | 4/2004 | Bangor |
| 2004/0177133 A1 | 9/2004 | Harrison et al. |
| 2004/0243941 A1 | 12/2004 | Fish |
| 2004/0267872 A1 | 12/2004 | Serdy et al. |
| 2005/0071209 A1 | 3/2005 | Tatavu et al. |
| 2005/0198629 A1 | 9/2005 | Vishwanath |
| 2005/0289013 A1 | 12/2005 | Goldberg |
| 2005/0289072 A1 | 12/2005 | Sabharwal |
| 2006/0059029 A1 | 3/2006 | Chalasani et al. |
| 2006/0059539 A1 | 3/2006 | Shashikumar et al. |
| 2006/0143704 A1 | 6/2006 | Rits et al. |
| 2006/0173724 A1 | 8/2006 | Trefler et al. |
| 2006/0265583 A1 | 11/2006 | Eilam et al. |
| 2006/0277595 A1 | 12/2006 | Kinser et al. |
| 2007/0005536 A1 | 1/2007 | Caswell et al. |
| 2007/0028098 A1 | 2/2007 | Baartman et al. |
| 2007/0043784 A1 | 2/2007 | Parkinson |
| 2007/0112952 A1 | 5/2007 | Sodhi et al. |
| 2007/0150480 A1 | 6/2007 | Hwang et al. |
| 2007/0169168 A1 | 7/2007 | Lim |
| 2007/0174101 A1 | 7/2007 | Li et al. |
| 2007/0203798 A1 | 8/2007 | Caballero et al. |
| 2007/0215683 A1 | 9/2007 | Koorland et al. |
| 2007/0220140 A1 | 9/2007 | Weidenschlager |
| 2007/0283147 A1 | 12/2007 | Fried et al. |
| 2008/0027825 A1 | 1/2008 | Boonie et al. |
| 2008/0059469 A1 | 3/2008 | Pruet |
| 2008/0077680 A1 | 3/2008 | Dellarole et al. |
| 2008/0080718 A1 | 4/2008 | Meijer et al. |
| 2008/0083036 A1 | 4/2008 | Ozzie et al. |
| 2008/0089520 A1 | 4/2008 | Kessler |
| 2008/0097816 A1 | 4/2008 | Freire et al. |
| 2008/0127183 A1 | 5/2008 | Emerson et al. |
| 2008/0189250 A1 | 8/2008 | Cha et al. |
| 2008/0250074 A1 | 10/2008 | Parkinson |
| 2008/0256419 A1* | 10/2008 | Wojewoda ......... G06F 11/1052 714/766 |
| 2008/0256606 A1 | 10/2008 | Koikara et al. |
| 2008/0270597 A1 | 10/2008 | Tenenti |
| 2008/0281617 A1 | 11/2008 | Conrad et al. |
| 2008/0313716 A1 | 12/2008 | Park |
| 2009/0063580 A1 | 3/2009 | Allen et al. |
| 2009/0126007 A1 | 5/2009 | Zamberlan et al. |
| 2009/0157457 A1 | 6/2009 | Huuhtanen et al. |
| 2009/0178102 A1 | 7/2009 | Alghathbar et al. |
| 2009/0205018 A1 | 8/2009 | Ferraiolo et al. |
| 2009/0265753 A1 | 10/2009 | Anderson et al. |
| 2009/0300604 A1 | 12/2009 | Barringer |
| 2009/0320093 A1 | 12/2009 | Glazier et al. |
| 2010/0114618 A1 | 5/2010 | Wilcock et al. |
| 2010/0161552 A1 | 6/2010 | Murarasu et al. |
| 2010/0198730 A1 | 8/2010 | Ahmed et al. |
| 2010/0205152 A1 | 8/2010 | Ansari et al. |
| 2010/0211781 A1 | 8/2010 | Auradkar et al. |
| 2010/0251339 A1 | 9/2010 | McAlister |
| 2010/0280958 A1 | 11/2010 | Hasson et al. |
| 2010/0306818 A1 | 12/2010 | Li et al. |
| 2010/0318393 A1 | 12/2010 | Acker et al. |
| 2010/0332629 A1 | 12/2010 | Cotugno et al. |
| 2011/0004679 A1 | 1/2011 | Lo et al. |
| 2011/0029983 A1 | 2/2011 | Lu et al. |
| 2011/0072436 A1 | 3/2011 | Gilat et al. |
| 2011/0103566 A1 | 5/2011 | Sarkar et al. |
| 2011/0126207 A1 | 5/2011 | Wipfel et al. |
| 2011/0131146 A1 | 6/2011 | Skutnik |
| 2011/0131309 A1 | 6/2011 | Akiyama et al. |
| 2011/0137805 A1 | 6/2011 | Brookbanks et al. |
| 2011/0138051 A1 | 6/2011 | Dawson et al. |
| 2011/0153969 A1 | 6/2011 | Petrick |

(56) References Cited

U.S. PATENT DOCUMENTS

| | | |
|---|---|---|
| 2011/0211686 A1 | 9/2011 | Wall et al. |
| 2011/0218813 A1 | 9/2011 | Addala et al. |
| 2011/0218842 A1 | 9/2011 | Addala et al. |
| 2011/0218924 A1 | 9/2011 | Addala et al. |
| 2011/0218925 A1 | 9/2011 | Addala et al. |
| 2011/0219218 A1 | 9/2011 | Addala et al. |
| 2011/0225081 A1 | 9/2011 | Kittelsen et al. |
| 2011/0231280 A1 | 9/2011 | Farah |
| 2011/0238458 A1 | 9/2011 | Purcell et al. |
| 2011/0276951 A1* | 11/2011 | Jain ............................ 717/140 |
| 2011/0288968 A1 | 11/2011 | King et al. |
| 2011/0307523 A1 | 12/2011 | Balani et al. |
| 2011/0313902 A1 | 12/2011 | Liu et al. |
| 2011/0314466 A1 | 12/2011 | Berg et al. |
| 2011/0320605 A1 | 12/2011 | Kramer et al. |
| 2012/0005341 A1 | 1/2012 | Seago et al. |
| 2012/0032945 A1 | 2/2012 | Dare et al. |
| 2012/0036220 A1 | 2/2012 | Dare et al. |
| 2012/0036245 A1 | 2/2012 | Dare et al. |
| 2012/0036440 A1 | 2/2012 | Dare et al. |
| 2012/0036442 A1 | 2/2012 | Dare et al. |
| 2012/0036552 A1 | 2/2012 | Dare et al. |
| 2012/0041844 A1 | 2/2012 | Shen et al. |
| 2012/0047357 A1 | 2/2012 | Bealkowski |
| 2012/0066755 A1 | 3/2012 | Peddada et al. |
| 2012/0072555 A1 | 3/2012 | DeLuca et al. |
| 2012/0089426 A1 | 4/2012 | Borucki |
| 2012/0096521 A1 | 4/2012 | Peddada |
| 2012/0102160 A1 | 4/2012 | Breh et al. |
| 2012/0110583 A1 | 5/2012 | Balko et al. |
| 2012/0131166 A1 | 5/2012 | Barbedette et al. |
| 2012/0131194 A1 | 5/2012 | Morgan |
| 2012/0136936 A1 | 5/2012 | Quintuna |
| 2012/0150693 A1 | 6/2012 | Dueck et al. |
| 2012/0159494 A1 | 6/2012 | Shafiee et al. |
| 2012/0159503 A1 | 6/2012 | Shafiee et al. |
| 2012/0221454 A1 | 8/2012 | Morgan |
| 2012/0226796 A1 | 9/2012 | Morgan |
| 2012/0226808 A1 | 9/2012 | Morgan |
| 2012/0246248 A1 | 9/2012 | Arita |
| 2012/0271949 A1 | 10/2012 | Radhakrishnan et al. |
| 2012/0284776 A1 | 11/2012 | Sundaram et al. |
| 2012/0297441 A1 | 11/2012 | Boldyrev et al. |
| 2012/0304191 A1 | 11/2012 | Morgan |
| 2012/0311153 A1 | 12/2012 | Morgan |
| 2012/0311154 A1 | 12/2012 | Morgan |
| 2012/0324092 A1* | 12/2012 | Brown ............... G06F 9/5044 709/224 |
| 2013/0007195 A1 | 1/2013 | Rinard et al. |
| 2013/0007265 A1 | 1/2013 | Benedetti et al. |
| 2013/0030859 A1 | 1/2013 | Jung et al. |
| 2013/0042005 A1 | 2/2013 | Boss et al. |
| 2013/0047230 A1 | 2/2013 | Krishnan et al. |
| 2013/0086269 A1* | 4/2013 | Bairavasundaram . G06F 9/5011 709/226 |
| 2013/0103640 A1 | 4/2013 | Rehman |
| 2013/0110943 A1 | 5/2013 | Menon et al. |
| 2013/0117157 A1 | 5/2013 | Iyoob et al. |
| 2013/0124401 A1 | 5/2013 | Del Real |
| 2013/0145300 A1 | 6/2013 | Mackay et al. |
| 2013/0152183 A1 | 6/2013 | Plewnia et al. |
| 2013/0204994 A1 | 8/2013 | Deshmukh et al. |
| 2013/0212160 A1 | 8/2013 | Lawson et al. |
| 2013/0212420 A1 | 8/2013 | Lawson et al. |
| 2013/0254882 A1 | 9/2013 | Kannappan et al. |
| 2013/0262556 A1 | 10/2013 | Xu et al. |
| 2013/0268480 A1 | 10/2013 | Dorman |
| 2013/0268491 A1 | 10/2013 | Chung et al. |
| 2013/0275509 A1 | 10/2013 | Micucci et al. |
| 2013/0283350 A1 | 10/2013 | Afek et al. |
| 2013/0290710 A1 | 10/2013 | Broder et al. |
| 2013/0298210 A1* | 11/2013 | Wright ............... H04L 63/0869 726/7 |
| 2013/0298212 A1 | 11/2013 | Shah et al. |
| 2013/0332984 A1 | 12/2013 | Sastry et al. |
| 2013/0332985 A1 | 12/2013 | Sastry et al. |
| 2013/0336235 A1 | 12/2013 | Meyer et al. |
| 2014/0020054 A1 | 1/2014 | Lim |
| 2014/0059002 A1 | 2/2014 | Lockhart et al. |
| 2014/0074539 A1 | 3/2014 | Doering et al. |
| 2014/0074540 A1 | 3/2014 | Evans et al. |
| 2014/0074544 A1 | 3/2014 | Seetharam et al. |
| 2014/0074659 A1 | 3/2014 | Chatterjee et al. |
| 2014/0074788 A1 | 3/2014 | Chatterjee et al. |
| 2014/0074793 A1 | 3/2014 | Doering et al. |
| 2014/0074999 A1 | 3/2014 | Khalsa et al. |
| 2014/0075016 A1 | 3/2014 | Chatterjee et al. |
| 2014/0075027 A1 | 3/2014 | Chatterjee et al. |
| 2014/0075031 A1 | 3/2014 | Doering et al. |
| 2014/0075032 A1 | 3/2014 | Vasudevan et al. |
| 2014/0075033 A1 | 3/2014 | Doering et al. |
| 2014/0075034 A1 | 3/2014 | Vasudevan et al. |
| 2014/0075499 A1 | 3/2014 | Arun et al. |
| 2014/0075501 A1 | 3/2014 | Srinivasan et al. |
| 2014/0075565 A1 | 3/2014 | Srinivasan et al. |
| 2014/0141743 A1 | 5/2014 | Shaw |
| 2014/0143083 A1 | 5/2014 | Prathipati et al. |
| 2014/0192717 A1 | 7/2014 | Liu et al. |
| 2014/0237502 A1 | 8/2014 | Kelsen et al. |
| 2014/0280943 A1 | 9/2014 | Bobrov et al. |
| 2014/0372533 A1 | 12/2014 | Fu et al. |
| 2015/0156218 A1 | 6/2015 | Arun et al. |
| 2015/0254286 A1 | 9/2015 | Dutta et al. |
| 2015/0363724 A1 | 12/2015 | Chatterjee et al. |
| 2015/0365301 A1 | 12/2015 | Chatterjee et al. |
| 2016/0070772 A1 | 3/2016 | Chatterjee et al. |
| 2016/0105372 A1 | 4/2016 | Vasudevan et al. |

FOREIGN PATENT DOCUMENTS

| | | |
|---|---|---|
| EP | 1914951 A1 | 4/2008 |
| EP | 2458548 A1 | 5/2012 |
| EP | 2893685 | 7/2015 |
| JP | 2015529367 | 10/2015 |
| WO | 2009/018584 A1 | 2/2009 |
| WO | 2010149222 | 12/2010 |
| WO | WO2012070993 A1 | 5/2012 |
| WO | 2014039772 | 3/2014 |
| WO | 2014039882 | 3/2014 |
| WO | 2014039918 | 3/2014 |
| WO | 2014039919 | 3/2014 |
| WO | 2014039921 | 3/2014 |
| WO | 2015/191119 A1 | 12/2015 |

OTHER PUBLICATIONS

Oracle Identity Management 11 g—An Oracle Whitepaper, Oracle, Jul. 2010, 61 pages.

Alcaraz Calero, Jose M. et al., "Toward a Multi-Tenancy Authorization System for Cloud Services", IEEE Computer and Realibily Societies, Nov./Dec. 2010, pp. 48-55.

Tsai, Wei-Tek et al., "Role-Based Access Control Using Reference Ontology in Clouds", IEEE, 2011 Tenth International Symposium on Autonomous Decentralized Systems, 2011, pp. 121-128.

Wainwright, Steve, "Oracle Public Cloud—An Enterprise Cloud for Business Critical Applications", Oracle, 2011, 39 pages.

Oracle Unveils Oracle Public Cloud, Oracle, Oct. 5, 2011, 2 pages.

Lau, Christina et al., "Best Practices for access control in multi-tenant cloud solutions using Tivoli Access Manager", IBM, DeveloperWorks, May 1, 2011, 8 pages.

Rashee, Haroon et al., "Multi-Tenancy on Private Cloud", Enlighten, Feb. 2012, 20 pages.

The Oracle Identity Management Platform: Identity Services at Internet Scale, Oracle, Jul. 2012, 20 pages.

U.S. Appl. No. 13/842,269, Notice of Allowance mailed on Nov. 3, 2014, 8 pages.

U.S. Appl. No. 13/842,833, Notice of Allowance mailed on Dec. 15, 2014, 11 pages.

U.S. Appl. No. 13/840,943, Non-Final Office Action mailed on Dec. 18, 2014, 10 pages.

(56) References Cited

OTHER PUBLICATIONS

U.S. Appl. No. 13/843,613, Non-Final Office Action mailed on Jan. 23, 2015, 17 pages.
U.S. Appl. No. 14/019,051, Non-Final Office Action mailed on Nov. 20, 2014, 5 pages.
U.S. Appl. No. 13/838,813, Final Office Action mailed on Dec. 4, 2014, 24 pages.
U.S. Appl. No. 13/907,689, Non-Final Office Action mailed on Jan. 7, 2015, 11 pages.
International Application No. PCT/US2013/058426, International Preliminary Report on Patentability mailed on Dec. 5, 2014, 6 pages.
International Application No. PCT/US2013/058596, International Preliminary Report on Patentability mailed on Dec. 5, 2014, 6 pages.
An Introduction to Role-Based Access Control, NIST/ITL Bulletin, retrieved from the Internet: URL: http://csrc.nist.gov/groups/SNS/rbac/documents/design implementation/Intro_role_based_access.htm on Oct. 22, 2013, Dec. 1995, 5 pages.
Basic Traversals, The Neo4J Manual, Neo Technology, Inc. (copyright 2012), 7 Pages.
LDAP Authentication Overview, Juniper Networks, Inc. (copyright 1999-2010), 4 pages.
Oracle Internet Directory Administrator's Guide: Introduction to LDAP and Oracle Internet Directory, Oracle, 10g Release 2, B14082-02, retrieved from the Internet: URL: http://docs.oracle.com/cd/B14099_19/idmanage.1012/b14082/intro.htm on Oct. 1, 2013, 1999, 9 pages.
Using ldapsearch, *Red Hat Directory Server 8.2 Administration Guide for managing Directory Service instances Edition 8.2.8*, Red Hat, Inc. (copyright 2010), 3 pages.
XACML v3.0 Hierarchical Resource Profile Version 1.0, Oasis, Working Draft 7, retrieved from the Internet: URL: http://xml.coverpages.org/XACML-v30-HierarchicalResourceProfile-WD7.pdf on Aug. 29, 2013., Apr. 1, 2009, 22 pages.
Afgan et al., CloudMan as a Tool Execution Framework for the Cloud, IEEE Proceedings of The 35th International Convention on Information and Communication Technology, Electronics and Microelectronics (MIPRO 2012), pp. 437-441.
Anthony et al., Consolidation Best Practices: Oracle Database 12c plugs you into the cloud, Oracle White Paper, retrieved from the Internet: URL: http://www.oracle.com/us/products/database/database-private-cloud-wp- 360048.pdf on Oct. 1, 2013, Jul. 2013, 30 pages.
Bastos et al., Towards a Cloud-Based Environment for Space Systems Concept Design, IEEE International Conference on Informational Society (I-Society 2012), pp. 478-483.
Bierman et al., Network Configuration Protocol (NETCONF) Access Control Model, Internet Engineering Task Force, RFC 6536, retrieved from the Internet: URL: http://tools.ietf.org/html/rfc6536 on Aug. 29, 2013, Mar. 2012, 50 pages.
Chanliau et al., Oracle Fusion Middleware: Oracle Platform Security Services (OPSS) FAQ, Oracle Corporation, retrieved from the Internet: URL: http://www.oracle.com/technetwork/testcontent/opss-faq-131489.pdf on Oct. 1, 2013, Jul. 2010, 6 pages.
Chiba et al., Dynamic Authorization Extension to Remote Authentication Dial in User Service (RADIUS), Network Working Group, RFC 5176, retrieved from the Internet: URL: http://tools.ietf.org/html/rfc5176 on Aug. 29, 2013, Jan. 2008, 35 pages.
Clemm et al., Web Distributed Authoring and Versioning (WebDAV) Access Control Protocol, Network Working Group, RFC 3744, retrieved from the Internet: URL: http://www.ietf.org/rfc/rfc3744.txt on Aug. 29, 2013, May 2004, 66 pages.
Datta et al., Oracle Fusion Middleware Developer's Guide for Oracle Identity.Manager, Oracle Corporation, 11g Release 2, E27150-08, retrieved from the Internet: URL: http://docs.oracle.com/cd/E37115_01/dev.1112/e27150/toc.htm on Oct. 1, 2013, Sep. 2013, 1102 pages.
Demarest et al., Oracle Cloud Computing, An Oracle White Paper, Oracle Corporation, Redwood Shores, CA, May 2010, 22 pages.
Hunter, LDAP Searching—Setting the SCOPE Parameters, available at http://www.idevelopment.info/data/LDAP/LDAP_Resources/SEARCH_Setting_the_SCOPE_Parameter.shtml, (copyright 1998-2013), 2 pages.
Paul et al., Architectures for the future networks and the next generation Internet: A survey, Computer Communications 34: 2-42 (2011).
International Patent Application No. PCT/US2013/058426, International Search Report and Written Opinion mailed on Nov. 8, 2013, 9 pages.
International Patent Application No. PCT/US2013/058596, International Search Report and Written opinion mailed on Nov. 22, 2013, 9 pages.
International Patent Application No. PCT/US2013/058638, International Search Report and Written Opinion mailed on Jan. 8, 2014, 11 pages.
International Patent Application No. PCT/US2013/058639, International Search Report and Written Opinion mailed on Jan. 8, 2014, 10 pages.
International Patent Application No. PCT/US2013/058642, International Search Report & Written Opinion mailed on Feb. 7, 2014, 17 pages.
Subi et al., Oracle Fusion Middleware Application Security Guide, Oracle Corporation, 11g Release 1, E10043-09, retrieved from the Internet: URL: http://docs.oracle.com/cd/E21764_01/core.1111/e10043/underjps.htm on Oct. 1, 2013, May 2011, 834 pages.
Teger et al., Oracle Fusion Middleware Developer's Guide for Oracle Access Management, Oracle Corporation, 11g Release 2, E27134-06, retrieved from the Internet: URL: http://docs.oracle.com/cd/E37115_01/dev.1112/e27134/toc.htm on Oct. 1, 2013, Jul. 2013, 372 pages.
Teger, Oracle Fusion Middleware Developer's Guide for Oracle Entitlements Server, Oracle Corporation, 11g Release 1, E27154-01, retrieved from the Internet: URL: http://docs.oracle.com/cd/E27559_01/dev.1112/e27154/handle_auth_calls.htm on Oct. 1, 2013, Jul. 2012, 132 pages.
U.S. Appl. No. 13/842,269, Non Final Office Action mailed on Jun. 5, 2014, 12 pages.
U.S. Appl. No. 13/838,813, Non Final Office Action mailed on Aug. 14, 2014, 22 pages.
International Application No. PCT/US2013/058642, Invitation to restrict or pay additional fees mailed on Jul. 23, 2014, 3 pages.
International Patent Application No. PCT/US2013/058426, Written Opinion, mailed Aug. 19, 2014, 7 pages.
International Patent Application No. PCT/US2013/058596, Written Opinion, mailed Aug. 19, 2014, 6 pages.
Non-Final Office Action mailed on Aug. 28, 2014 in U.S. Appl. No. 13/838,113, 14 pages.
Non-Final Office Action mailed on Sep. 11, 2014 in U.S. Appl. No. 13/838,537, 22 pages.
Written Opinion mailed on Sep. 11, 2014 in International Application. No. PCT/US2013/058642, 8 pages.
U.S. Appl. No. 13/909,795, Notice of Allowance mailed on Sep. 18, 2015, 5 pages.
U.S. Appl. No. 13/841,768, Non-Final Office Action mailed on Oct. 6, 2015, 11 pages.
U.S. Appl. No. 13/841,994, Non-Final Office Action mailed on Oct. 26, 2015, 8 pages.
Office Action mailed Sep. 4, 2015 in U.S. Appl. No. 14/618,791, 17 pages.
Oracle Service Contracts, User Guide, Release 12, Oracle, Part No. B25717-02, Jun. 2007, 534 pages.
Emig et al., An Access Control Metamodel for Web Service-Oriented Architecture, IEEE, 2007, pp. 1-8.
Jahid et al., MyABDAC: Compiling XACML Policies for Attribute-Based Database Access Control, ACM, Feb. 23, 2011, pp. 97-108.
Kagal et al., A Policy Language for a Pervasive Computing Environment, Proceedings of the 4th IEEE International Workshop on Policies for Distributed Systems and Networks, 2003, pp. 63-74.
Koved et al., Access Rights Analysis for Java, Proceedings of the 17th ACM SIGPLAN conference on Object-oriented programming, systems, languages, and applications, 2002, pp. 359-372.

(56) References Cited

OTHER PUBLICATIONS

U.S. Appl. No. 13/835,307, Non-Final Office Action mailed on Feb. 18, 2015, 12 pages.
U.S. Appl. No. 13/838,113, Notice of Allowance mailed on Feb. 23, 2015, 15 pages.
U.S. Appl. No. 13/838,537, Notice of Allowance mailed on Feb. 4, 2015, 19 pages.
U.S. Appl. No. 13/838,813, Non-Final Office Action mailed on Mar. 12, 2015, 21 pages.
U.S. Appl. No. 13/906,835, Non-Final Office Action mailed on Mar. 20, 2015, 16 pages.
U.S. Appl. No. 13/843,613, Final Office Action mailed on Jun. 2, 2015, 20 pages.
U.S. Appl. No. 13/909,795, Non-Final Office Action mailed on Apr. 23, 2015, 9 pages.
Notice of Allowance mailed Jun. 29, 2015 in U.S. Appl. No. 13/840,943, 10 pages.
U.S. Appl. No. 13/841,243 Non-Final Office Action mailed on Jul. 15, 2015, 15 pages.
U.S. Appl. No. 14/019,051, Notice of Allowance mailed on Feb. 27, 2015, 7 pages.
Office action mailed Aug. 7, 2015 in U.S. Appl. No. 13/906,835, 21 pages.
International Application No. PCT/US2013/058639, Written Opinion mailed on Jul. 7, 2015, 6 pages.
International Application No. PCT/US2015/016214 International Search Report and Written Opinion mailed on May 11, 2015, 11 pages.
International Application No. PCT/US2013/058642, International Preliminary Report on Patentability mailed on Jan. 20, 2015, 10 pages.
U.S. Appl. No. 13/907,652, Final Office Action mailed on Dec. 17, 2015, 10 pages.
U.S. Appl. No. 14/618,791, Notice of Allowance mailed on Dec. 21, 2015, 7 pages.
U.S. Appl. No. 14/618,791, Supplemental Notice of Allowability mailed on Jan. 6, 2016, 2 pages.
EP Patent Application No. 13766777.0, Office Action mailed Feb. 10, 2016, 5 pages.
U.S. Appl. No. 13/843,613, Non-Final Office Action mailed Mar. 21, 2016, 12 pages.
U.S. Appl. No. 13/841,243, Notice of Allowance mailed on Mar. 22, 2016, 8 pages.
U.S. Appl. No. 13/906,835, Non-Final Office Action mailed Apr. 13, 2016, 14 pages.
Oracle White Papers, Delivering Database as a Service (DBaaS) using Oracle Enterprise Manager 12c, Available online at:URL:http://www.oracle.com/technetwork/oem /cloud-mgmt/dbaasoverview-wp-1915651.pdf, Oct. 2013, 21 pages.
International Application No. PCT/US2015/016214, Written Opinion mailed on Jun. 3, 2016, 5 pages.
U.S. Appl. No. 13/841,768, Final Office Action mailed on Jun. 17, 2016, 13 pages.
U.S. Appl. No. 13/841,994, Final Office Action mailed on May 19, 2016, 10 pages.
U.S. Appl. No. 14/664,528, Non-Final Office Action mailed on May 9, 2016, 19 pages.
U.S. Appl. No. 14/624,356, Non-Final Office Action mailed on Sep. 15, 2016, 9 pages.
U.S. Appl. No. 14/664,528, Non Final Office Action mailed on Nov. 3, 2016, 18 pages.
U.S. Appl. No. 13/841,994, Notice of Allowance mailed on Dec. 5, 2016, 5 pages.
International Application No. PCT/US2015/016214, International Preliminary Report on Patentability mailed on Sep. 19, 2016, 6 pages.
U.S. Appl. No. 14/624,356, Final Office Action mailed on Mar. 13, 2017, 13 pages.
"World of Warcraft: Catacylsm Can Run When It Is Partially", downloaded from URL:https://zhidao.baidu.com/question/315386072.html, (Sep. 3, 2011) 1 page.
China Patent Application No. CN201380046472.4, Office Action mailed on Feb. 20, 2017, 25 pages.

* cited by examiner

FAILURE HANDLING IN THE EXECUTION FLOW OF PROVISIONING OPERATIONS IN A CLOUD ENVIRONMENT

CROSS-REFERENCES TO RELATED APPLICATIONS

The present application is a non-provisional of and claims the benefit and priority under 35 U.S.C. 119(e) of the following applications, the entire contents of which are incorporated herein by reference for all purposes:
(1) U.S. Provisional Application No. 61/698,413, filed Sep. 7, 2012, entitled TENANT AUTOMATION SYSTEM;
(2) U.S. Provisional Application No. 61/698,459, filed Sep. 7, 2012, entitled SERVICE DEVELOPMENT INFRASTRUCTURE;
(3) U.S. Provisional Application No. 61/785,299, filed Mar. 14, 2013, entitled CLOUD INFRASTRUCTURE;
(4) U.S. Provisional Application No. 61/799,940, filed Mar. 15, 2013, entitled FAILURE HANDLING IN THE EXECUTION FLOW OF PROVISIONING OPERATIONS IN A CLOUD ENVIRONMENT; and
(5) U.S. Provisional Application No. 61/794,427, filed Mar. 15, 2013, entitled CLOUD INFRASTRUCTURE

BACKGROUND

The present disclosure relates to computer systems and software, and more particularly to techniques for facilitating and automating the provision of services in a cloud environment.

Cloud computing is a model for enabling convenient, on-demand network access to a shared pool of configurable computing resources (e.g., networks, servers, storage, applications, and services). The services provided or accessed through the cloud (or network) are referred to as cloud services. There is a lot of processing that needs to be performed by a cloud service provider to make cloud services available to a subscribing customer. Due to its complexity, much of this processing is still done manually. For example, provisioning resources for providing such cloud services can be a very labor intensive process.

SUMMARY

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to some embodiments, a method for handling failures in the execution flow of provisioning operations is disclosed. The method may comprise receiving, by a cloud infrastructure system, an error from the execution flow of provisioning a service from a plurality of service provided by the cloud infrastructure system, the cloud infrastructure system comprising one or more computing devices. Additionally, the method may further comprise determining, by a computing device from the one or more computing devices, a specific service associated with the error and determining an error classification type associated with the error based on the specific service. Subsequently, the method may further comprise performing, by the computing device, a corrective action based on the specific service and the error type.

According to some embodiments, a system may comprise: one or more computing devices configurable to offer a set of cloud services; a memory configurable to store an error from provisioning a service from the set of cloud services; and wherein a computing device from the one or more computing devices is configurable to: determine a specific service associated with the error; determine an error classification type associated with the error based on the specific service; and perform a corrective action based on the specific service and the error type.

According to some embodiments, one or more computer-readable media storing computer-executable instructions for a cloud infrastructure system is configured to offer a set of cloud services that, when executed, may cause one or more computing device in the cloud infrastructure system to: store an error from provisioning a service from the set of cloud services; determine a specific service associated with the error; determine an error classification type associated with the error based on the specific service; and perform a corrective action based on the specific service and the error type.

BRIEF DESCRIPTION OF THE DRAWINGS

Illustrative embodiments of the present invention are described in detail below with reference to the following drawing figures.

DETAILED DESCRIPTION

Figure 1A:
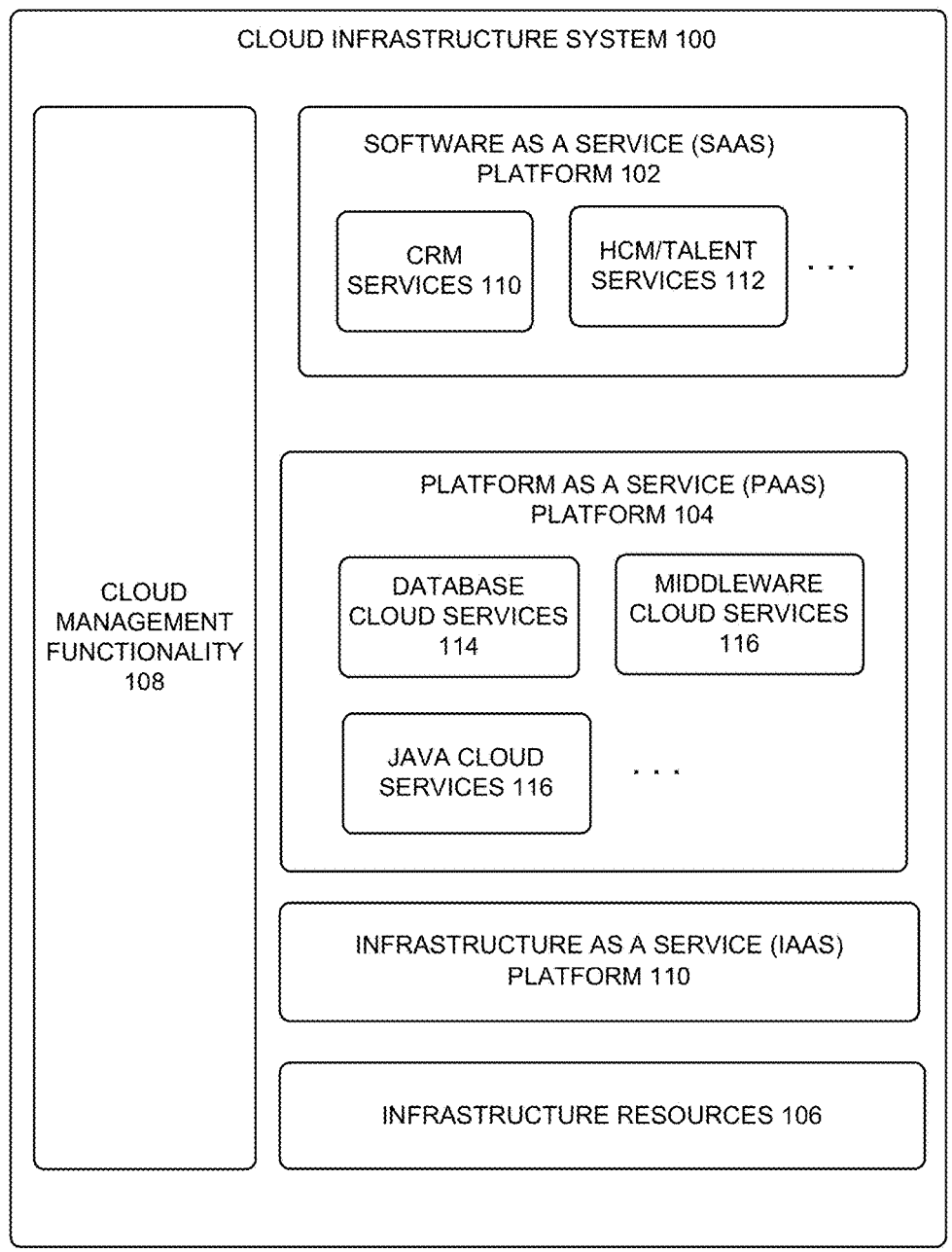
FIG. 1A is a logical view of a cloud infrastructure system according to one embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Certain embodiments of the present invention provide techniques for automating the provisioning, managing and tracking of services provided by a cloud infrastructure system.

In certain embodiments, a cloud infrastructure system may include a suite of applications, middleware and database service offerings that are delivered to a customer in a self-service, subscription-based, elastically scalable, reliable, highly available, and secure manner. An example of such a cloud infrastructure system is the Oracle Public Cloud provided by the present assignee.

A cloud infrastructure system may provide many capabilities including, but not limited to, provisioning, managing and tracking a customer's subscription for services and resources in the cloud infrastructure system, providing predictable operating expenses to customers utilizing the services in the cloud infrastructure system, providing robust identity domain separation and protection of a customer's data in the cloud infrastructure system, providing customers with a transparent architecture and control of the design of the cloud infrastructure system, providing customers assured data protection and compliance with data privacy standards and regulations, providing customers with an integrated development experience for building and deploying services in the cloud infrastructure system and providing customers with a seamless integration between business software, middleware, database and infrastructure services in the cloud infrastructure system.

In certain embodiments, services provided by the cloud infrastructure system may include a host of services that are made available to users of the cloud infrastructure system on demand such as online data storage and backup solutions, Web-based e-mail services, hosted office suites and document collaboration services, database processing, managed technical support services and the like. Services provided by the cloud infrastructure system can dynamically scale to meet the needs of its users. A specific instantiation of a service provided by cloud infrastructure system is referred to herein as a service instance. In general, any service made available to a user via a communication network such as the Internet from a cloud service provider's system is referred to as a cloud service. Typically, in a public cloud environment, servers and systems that make up the cloud service provider's system are different from the customer's own on-premises servers and systems. For example, a cloud service provider's system may host an application and a user may, via a communication network such as the Internet, on demand, order and use the application.

A service in a computer network cloud infrastructure includes protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and script-language middleware engine for private use by a networked developer. As another example, a service can include access to an email software application hosted on a cloud vendor's web site.

FIG. 1A is a logical view of a cloud infrastructure system according to one embodiment of the present invention. Cloud infrastructure system 100 may provide a variety of services via a cloud or networked environment. These services may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 100. Cloud infrastructure system 100 then performs processing to provide the services in the customer's subscription order.

Cloud infrastructure system 100 may provide the cloud services via different deployment models. For example, services may be provided under a public cloud model where cloud infrastructure system 100 is owned by an organization selling cloud services (e.g., owned by Oracle) and the services are made available to the general public or different industry enterprises. As another example, services may be provided under a private cloud model where cloud infrastructure system 100 is operated solely for a single organization and may provide services for one or more entities within the organization. The cloud services may also be provided under a community cloud model where cloud infrastructure system 100 and the services provided by system 100 are shared by several organizations in a related community. The cloud services may also be provided under a hybrid cloud model, which is a combination of two or more different models.

As shown in FIG. 1A, cloud infrastructure system 100 may comprise multiple components, which working in conjunction, enable provision of services provided by cloud infrastructure system 100. In the embodiment illustrated in FIG. 1A, cloud infrastructure system 100 includes a SaaS platform 102, a PaaS platform 104, an IaaS platform 110, infrastructure resources 106, and cloud management functionality 108. These components may be implemented in hardware, or software, or combinations thereof.

SaaS platform 102 is configured to provide cloud services that fall under the SaaS category. For example, SaaS platform 102 may provide capabilities to build and deliver a suite of on-demand applications on an integrated development and deployment platform. SaaS platform 102 may manage and control the underlying software and infrastructure for providing the SaaS services. By utilizing the services provided by SaaS platform 102, customers can utilize applications executing on cloud infrastructure system 100. Customers can acquire the application services without the need for customers to purchase separate licenses and support.

Various different SaaS services may be provided. Examples include without limitation services that provide solutions for sales performance management, enterprise integration and business flexibility for large organizations, and the like. In one embodiment, the SaaS services may include Customer Relationship Management (CRM) services 110 (e.g., Fusion CRM services provided by the Oracle cloud), Human Capital Management (HCM)/Talent Management services 112, and the like. CRM services 110 may include services directed to reporting and management of a sales activity cycle to a customer, and others. HCM/Talent services 112 may include services directed to providing global workforce lifecycle management and talent management services to a customer.

Various different PaaS services may be provided by PaaS platform 104 in a standardized, shared and elastically scalable application development and deployment platform. Examples of PaaS services may include without limitation services that enable organizations (such as Oracle) to consolidate existing applications on a shared, common architecture, as well as the ability to build new applications that leverage the shared services provided by the platform. PaaS platform 104 may manage and control the underlying software and infrastructure for providing the PaaS services. Customers can acquire the PaaS services provided by cloud infrastructure system 100 without the need for customers to purchase separate licenses and support. Examples of PaaS services include without limitation Oracle Java Cloud Service (JCS), Oracle Database Cloud Service (DBCS), and others.

By utilizing the services provided by PaaS platform 104, customers can utilize programming languages and tools supported by cloud infrastructure system 100 and also control the deployed services. In some embodiments, PaaS services provided by the cloud infrastructure system 100 may include database cloud services 114, middleware cloud services (e.g., Oracle Fusion Middleware services) 116 and Java cloud services 117. In one embodiment, database cloud services 114 may support shared service deployment models that enable organizations to pool database resources and offer customers a database-as-a-service in the form of a database cloud, middleware cloud services 116 provides a platform for customers to develop and deploy various business applications and Java cloud services 117 provides a platform for customers to deploy Java applications, in the cloud infrastructure system 100. The components in SaaS platform 102 and PaaS platform 104 illustrated in FIG. 1A are meant for illustrative purposes only and are not intended to limit the scope of embodiments of the present invention. In alternate embodiments, SaaS platform 102 and PaaS platform 104 may include additional components for providing additional services to the customers of cloud infrastructure system 100.

Various different IaaS services may be provided by IaaS platform 110. The IaaS services facilitate the management and control of the underlying computing resources such as storage, networks, and other fundamental computing resources for customers utilizing services provided by the SaaS platform and the PaaS platform.

In certain embodiments, cloud infrastructure system 100 includes infrastructure resources 106 for providing the resources used to provide various services to customers of the cloud infrastructure system 100. In one embodiment, infrastructure resources 106 includes pre-integrated and optimized combinations of hardware such as servers, storage and networking resources to execute the services provided by the PaaS platform and the SaaS platform.

In certain embodiments, cloud management functionality 108 provides comprehensive management of cloud services (e.g., SaaS, PaaS, IaaS services) in the cloud infrastructure system 100. In one embodiment, cloud management functionality 108 includes capabilities for provisioning, managing and tracking a customer's subscription received by the cloud infrastructure system 100, and the like.

Figure 1B:
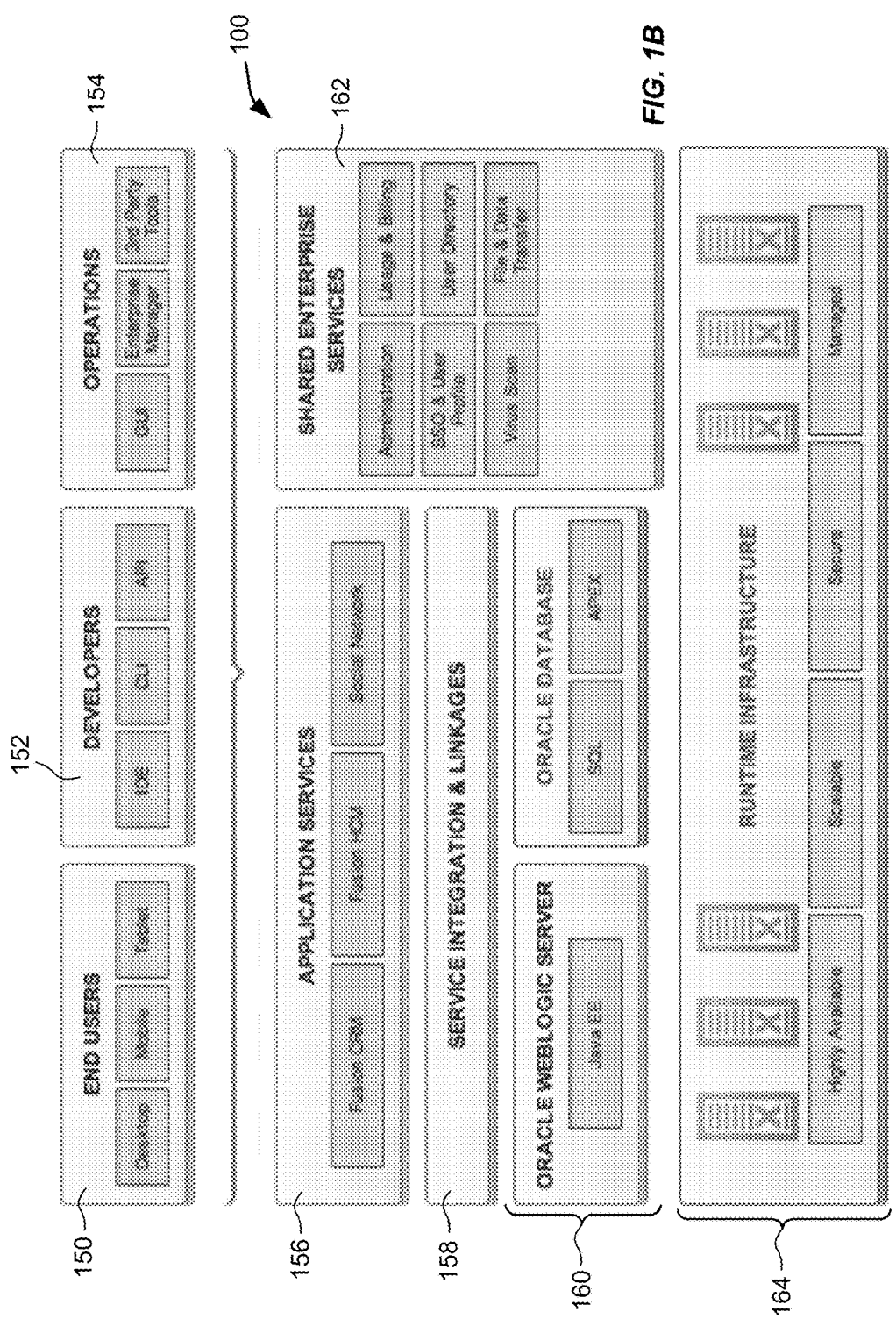
FIG. 1B is a simplified block diagram of a hardware/software stack that may be used to implement a cloud infrastructure system according to an embodiment of the present invention.

FIG. 1B is a simplified block diagram of a hardware/software stack that may be used to implement cloud infrastructure system 100 according to an embodiment of the present invention. It should be appreciated that implementation depicted in FIG. 1B may have other components than those depicted in FIG. 1B. Further, the embodiment shown in FIG. 1B is only one example of a cloud infrastructure system that may incorporate an embodiment of the invention. In some other embodiments, cloud infrastructure system 100 may have more or fewer components than shown in FIG. 1B, may combine two or more components, or may have a different configuration or arrangement of components. In certain embodiments, the hardware and software components are stacked so as to provide vertical integration that provides optimal performance.

Various types of users may interact with cloud infrastructure system 100. These users may include, for example, end users 150 that can interact with cloud infrastructure system 100 using various client devices such as desktops, mobile devices, tablets, and the like. The users may also include developers/programmers 152 who may interact with cloud infrastructure system 100 using command line interfaces (CLIs), application programming interfaces (APIs), through various integrated development environments (IDEs), and via other applications. User may also include operations personnel 154. These may include personnel of the cloud service provider or personnel of other users.

Application services layer 156 identifies various cloud services that may be offered by cloud infrastructure system 100. These services may be mapped to or associated with respective software components 160 (e.g., Oracle WebLogic server for providing Java services, oracle database for providing database services, and the like) via a service integration and linkages layer 158.

In certain embodiments, a number of internal services 162 may be provided that are shared by different components or modules of cloud infrastructure system 100 and by the services provided by cloud infrastructure system 100. These internal shared services may include, without limitation, a security and identity service, an integration service, an enterprise repository service, an enterprise manager service, a virus scanning and white list service, a high availability, backup and recovery service, service for enabling cloud support in IDEs, an email service, a notification service, a file transfer service, and the like.

Runtime infrastructure layer 164 represents the hardware layer on which the various other layers and components are built. In certain embodiments, runtime infrastructure layer 164 may comprise one Oracle's Exadata machines for providing storage, processing, and networking resources. An Exadata machine may be composed of various database servers, storage Servers, networking resources, and other components for hosting cloud-services related software layers. In certain embodiments, the Exadata machines may be designed to work with Oracle Exalogic, which is an engineered system providing an assemblage of storage, compute, network, and software resources. The combination of Exadata and Exalogic provides a complete hardware and software engineered solution that delivers high-performance, highly available, scalable, secure, and a managed platform for providing cloud services.

Figure 2:
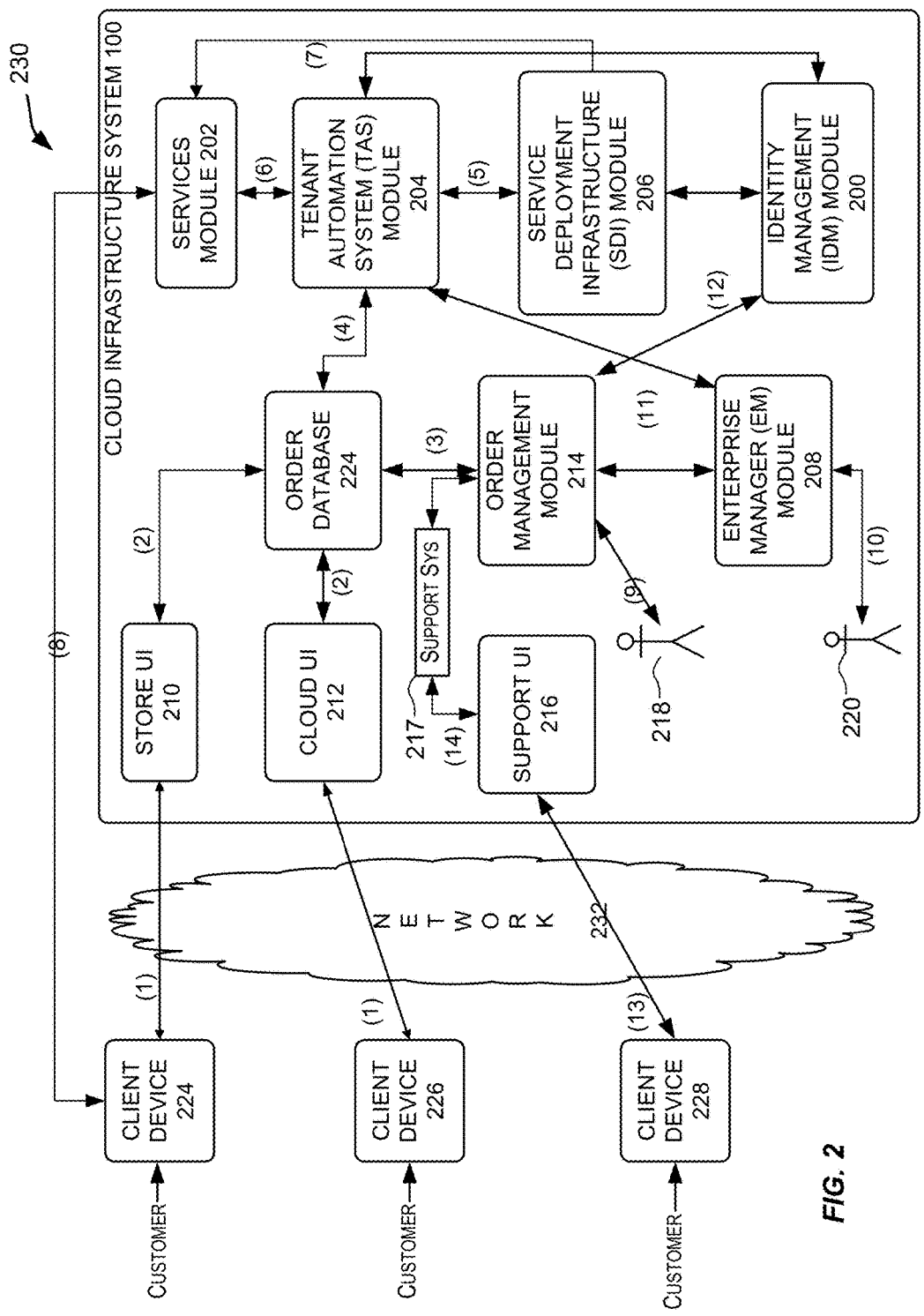
FIG. 2 is a simplified block diagram of a system environment for implementing the cloud infrastructure system shown in FIG. 1A.

FIG. 2 is a simplified block diagram of a system environment for implementing the cloud infrastructure system shown in FIG. 1A according to an embodiment of the present invention. In the illustrated embodiment, system environment 230 includes one or more client computing devices 224, 226 and 228 that may be used by users to interact with cloud infrastructure system 100. A client device may be configured to operate a client application such as a web browser, a proprietary client application (e.g., Oracle Forms), or some other application, which may be used by a user of the client device to interact with cloud infrastructure system 100 to utilize services provided by cloud infrastructure system 100.

It should be appreciated that cloud infrastructure system 100 depicted in FIG. 2 may have other components than those depicted in FIG. 2. Further, the embodiment shown in FIG. 2 is only one example of a cloud infrastructure system that may incorporate an embodiment of the invention. In some other embodiments, cloud infrastructure system 100 may have more or fewer components than shown in FIG. 2, may combine two or more components, or may have a different configuration or arrangement of components.

Client computing devices 224, 226 and 228 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), workstation computers running any of a variety of commercially-available UNIX or UNIX-like operating systems (including without limitation the variety of GNU/Linux operating systems), or any other computing device. For example, client computing devices 224, 226 and 228 may be any other electronic device, such as a thin-client computer, Internet-enabled gaming system, and/or personal messaging device, capable of communicating over a network (e.g., network 232 described below). Although exemplary system environment 230 is shown with three client computing devices, any number of client computing devices may be supported. Other devices such as devices with sensors, etc. may interact with cloud infrastructure system 100.

A network 232 may facilitate communications and exchange of data between clients 224, 226 and 228 and cloud infrastructure system 100. Network 232 may be any type of network familiar to those skilled in the art that can support data communications using any of a variety of commercially-available protocols, including without limitation TCP/IP, SNA, IPX, AppleTalk, and the like. Merely by way of example, network 232 can be a local area network (LAN) such as an Ethernet network, a Token-Ring network and/or the like, a wide-area network, a virtual network, including without limitation a virtual private network (VPN), the Internet, an intranet, an extranet, a public switched telephone network (PSTN), an infra-red network, a wireless network (e.g., a network operating under any of the IEEE 802.1X suite of protocols, the Bluetooth protocol known in the art, and/or any other wireless protocol), and/or any combination of these and/or other networks.

Cloud infrastructure system 100 may comprise one or more computers and/or servers which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computing devices that make up cloud infrastructure system 100 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

In various embodiments, cloud infrastructure system 100 may be adapted to automatically provision, manage and track a customer's subscription to services offered by cloud infrastructure system 100. In one embodiment, as depicted in FIG. 2, the components in cloud infrastructure system 100 include an Identity Management (IDM) module 200, a services module 202, a Tenant Automation System (TAS) module 204, a Service Deployment Infrastructure (SDI) module 206, an Enterprise Manager (EM) module 208, one or more front-end web interfaces such as a store user interface (UI) 210, a cloud user interface (UI) 212, and a support user interface (UI) 216, an order management module 214, sales personnel 218, operator personnel 220 and an order database 224. These modules may include or be provided using one or more computers and/or servers which may be general purpose computers, specialized server computers, server farms, server clusters, or any other appropriate arrangement and/or combination. In one embodiment, one or more of these modules can be provided by cloud management functionality 108 or IaaS platform 110 in cloud infrastructure system 100. The various modules of the cloud infrastructure system 100 depicted in FIG. 2 are meant for illustrative purposes only and are not intended to limit the scope of embodiments of the present invention. Alternative embodiments may include more or fewer modules than those shown in FIG. 2.

In an exemplary operation, at (1) a customer using a client device such as client device 224 or 226 may interact with cloud infrastructure system 100 by browsing the various services provided by cloud infrastructure system 100 and placing an order for a subscription for one or more services offered by cloud infrastructure system 100. In certain embodiments, the customer may access store UI 210 or cloud UI 212 and place a subscription order via these user interfaces.

The order information received by cloud infrastructure system 100 in response to the customer placing an order may include information identifying the customer and one or more services offered by the cloud infrastructure system 100 that the customer intends to subscribe to. A single order may include orders for multiple services. For instance, a customer may login to cloud UI 212 and request a subscription for a CRM service and a Java cloud service in the same order.

Additionally, the order may also include one or more service levels for the ordered services. As used herein, and as will be discussed in greater detail below, a service level for a service determines the amount of resources to be allocated for providing the requested service in the context of the subscription, such as the amount of storage, amount of computing resources, data transfer facilities, and the like. For example, a basic service level may provide a minimum level of storage, data transmission, or number of users, and higher service levels may include additional resources.

In addition, in some instances, the order information received by cloud infrastructure system 100 may include information indicative of a customer level, and the time period during which the service is desired. The customer level specifies the priority of the customer making the subscription request. In one example, the priority may be determined based on the quality of service that the cloud infrastructure system 100 guarantees or promises the customer as specified by a Service Level Agreement (SLA) agreed to between the customer and the provider of the cloud services. In one example, the different customer levels include a basic level, a silver level and a gold level. The time period for a service may specify the start date and time for the service and the time period for which the service is desired (e.g., a service end date and time may be specified).

In one embodiment, a customer may request a new subscription via store UI 210 or request for a trial subscription via cloud UI 212. In certain embodiments, store UI 210 may represent the service provider's eCommerce store front (e.g., www.oracle.com/store for Oracle Cloud services). Cloud UI 212 may represent a business interface for the service provider. Consumer can explore available services and sign up for interested services through cloud UI 212. Cloud UI 212 captures user input necessary for ordering trial subscriptions provided by cloud infrastructure system 100. Cloud UI 212 may also be used to view account features and configure the runtime environment located within cloud infrastructure system 100. In addition to placing an order for a new subscription, store UI 210 may also enable the customer to perform other subscription-related tasks such as changing the service level of a subscription, extending the term of the subscription, increasing the service level of a subscription, terminating an existing subscription, and the like.

After an order has been placed per (1), at (2), the order information that is received via either store UI 210 or cloud UI 212 is stored in order database 224, which can be one of several databases operated by cloud infrastructure system 100 and utilized in conjunction with other system elements. While order database 224 is shown logically as a single database in FIG. 2, in actual implementation, this may comprise one or more databases.

At (3), the order is forwarded to order management module 214. Order management module 214 is configured to perform billing and accounting functions related to the order such as verifying the order and upon verification, booking the order. In certain embodiments, order management module 214 may include a contract management module and an install base module. The contract management module may store contract information associated with the customer's subscription order such as the customer's service level agreement (SLA) with cloud infrastructure system 100. The install base module may include detailed descriptions of the services in the customer's subscription order. In addition to order information, the install base module may track installation details related to the services, product status and support service history related to the services. As a customer orders new services or upgrades existing ones, the install base module may automatically add new order information.

At (4), information regarding the order is communicated to TAS module 204. In one embodiment, TAS module 204 utilizes the order information to orchestrate the provisioning of services and resources for the order placed by the customer. At (5), TAS component 204 orchestrates the provisioning of resources to support the subscribed services using the services of SDI module 206. At (6) TAS module 204 provides information related to the provisioned order received from SDI module 206 to services module 202. In some embodiments, at (7), SDI module 206 may also use services provided by services module 202 to allocate and configure the resources needed to fulfill the customer's subscription order.

At (8), services module 202 sends a notification to the customers on client devices 224, 226 and 228 regarding the status of the order.

In certain embodiments, TAS module 204 functions as an orchestration component that manages business processes associated with each order and applies business logic to determine whether an order should proceed to provisioning. In one embodiment, upon receiving an order for a new subscription, TAS module 204 sends a request to SDI module 206 to allocate resources and configure those resources needed to fulfill the subscription order. SDI module 206 enables the allocation of resources for the services ordered by the customer. SDI module 206 provides a level of abstraction between the cloud services provided by cloud infrastructure system 100 and the physical implementation layer that is used to provision the resources for providing the requested services. TAS module 204 may thus be isolated from implementation details such as whether or not services and resources are actually provisioned on the fly or pre-provisioned and only allocated/assigned upon request.

In certain embodiments, a user may use store UI 210 to directly interact with order management module 214 to perform billing and accounting related functions such as verifying the order and upon verification, booking the order. In some embodiments, instead of a customer placing an order, at (9), the order may instead be placed by sales personnel 218 on behalf of the customer such as a customer's service representative or sales representative. Sales personnel 218 may directly interact with order management module 214 via a user interface (not shown in FIG. 2) provided by order management module 214 for placing orders or for providing quotes for the customer. This, for example, may be done for large customers where the order may be placed by the customer's sales representative through order management module 214. The sales representative may set up the subscription on behalf of the customer.

EM module 208 is configured to monitor activities related to managing and tracking a customer's subscription in cloud infrastructure system 100. EM module 208 collects usage statistics for the services in the subscription order such as the amount of storage used, the amount data transferred, the number of users, and the amount of system up time and system down time. At (10), a host operator personnel 220, who may be an employee of a provider of cloud infrastructure system 100, may interact with EM module 208 via an enterprise manager user interface (not shown in FIG. 2) to manage systems and resources on which services are provisioned within cloud infrastructure system 100.

Identity management (IDM) module 200 is configured to provide identity services such as access management and authorization services in cloud infrastructure system 100. In one embodiment, IDM module 200 controls information about customers who wish to utilize the services provided by cloud infrastructure system 100. Such information can include information that authenticates the identities of such customers and information that describes which actions those customers are authorized to perform relative to various system resources (e.g., files, directories, applications, communication ports, memory segments, etc.) IDM module 200 can also include the management of descriptive information about each customer and about how and by whom that descriptive information can be accessed and modified.

In one embodiment, information managed by the identity management module 200 can be partitioned to create separate identity domains. Information belonging to a particular identity domain can be isolated from all other identity domains. Also, an identity domain can be shared by multiple separate tenants. Each such tenant can be a customer subscribing to services in the cloud infrastructure system 100. In some embodiments, a customer can have one or many identity domains, and each identity domain may be associated with one or more subscriptions, each subscription having one or many services. For example, a single customer can represent a large entity and identity domains may be created for divisions/departments within this large entity. EM module 208 and IDM module 200 may in turn interact with order management module 214 at (11) and (12) respectively to manage and track the customer's subscriptions in cloud infrastructure system 100.

In one embodiment, at (13), support services may also be provided to the customer via a support UI 216. In one embodiment, support UI 216 enables support personnel to interact with order management module 214 via a support backend system to perform support services at (14). Support personnel in the cloud infrastructure system 100 as well as customers can submit bug reports and check the status of these reports via support UI 216.

Other interfaces, not shown in FIG. 2 may also be provided by cloud infrastructure system 100. For example, an identity domain administrator may use a user interface to IDM module 200 to configure domain and user identities. In addition, customers may log into a separate interface for each service they wish to utilize. In certain embodiments, a customer who wishes to subscribe to one or more services offered by cloud infrastructure system 100 may also be assigned various roles and responsibilities. In one embodiment, the different roles and responsibilities that may be assigned for a customer may include that of a buyer, an account administrator, a service administrator, an identity domain administrator or a user who utilizes the services and resources offered by cloud infrastructure system 100. The different roles and responsibilities are described more fully in FIG. 4 below.

Figure 3A:
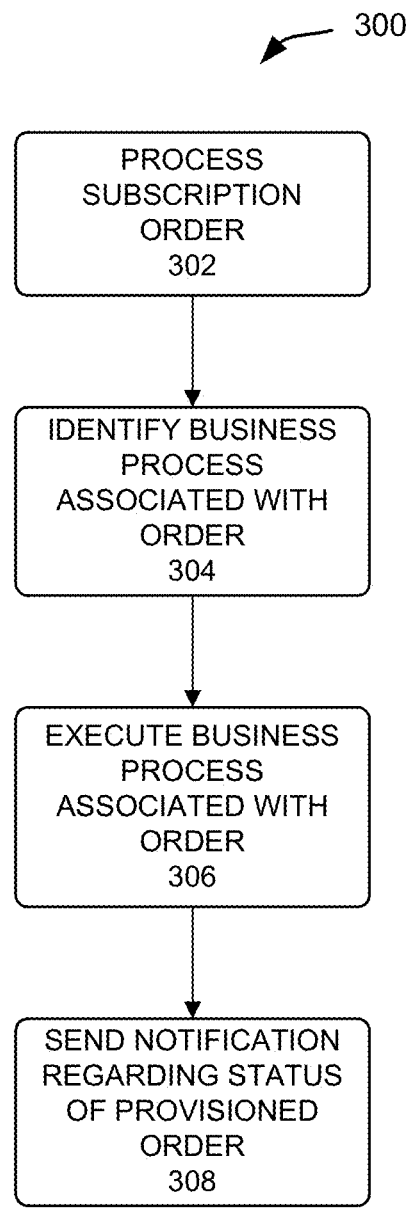
FIG. 3A depicts a simplified flowchart 300 depicting processing that may be performed by the TAS module in the cloud infrastructure system, in accordance with an embodiment of the present invention.

FIG. 3A depicts a simplified flowchart 300 depicting processing that may be performed by the TAS module in the cloud infrastructure system, in accordance with an embodiment of the present invention. The processing depicted in FIG. 3A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 3A is not intended to be limiting. Other sequences of steps may also be performed according to alternative embodiments. For example, alternative embodiments of the present invention may perform the steps outlined above in a different order. Moreover, the individual steps illustrated in FIG. 3A may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 3A may be performed by one or more components in TAS component 204 as will be described in detail in FIG. 3B.

At 302, a customer's subscription order is processed. The processing may include validating the order, in one example. Validating the order includes ensuring that the customer has paid for the subscription and ensuring that the customer does not already have subscriptions with the same name or that the customer is not attempting to create multiple subscriptions of the same type in the same identity domain for subscription types for which this is disallowed (such as, in the case of a CRM service). Processing may also include tracking the status of an order for each order that is being processed by cloud infrastructure system 100.

At 304, a business process associated with the order is identified. In some instances, multiple business processes may be identified for an order. Each business process identifies a series of steps for processing various aspects of the order. As an example, a first business process may identify one or more steps related to provisioning physical resources for the order, a second business process may identify one or more steps related to creating an identity domain along with customer identities for the order, a third business process may identify one or more steps for related to performing back office functions such as creating a customer record for the user, performing accounting functions related to the order, and the like. In certain embodiments, different business processes may also be identified for processing different services in an order. For example, different business process may be identified to process a CRM service and a database service.

At 306, the business process identified for the order in 304 is executed. Executing the business process associated with the order may include orchestrating the series of steps associated with the business process identified in step 304. For example, executing a business process related to provisioning physical resources for the order may include sending a request to SDI module 206 to allocate resources and configure those resources needed to fulfill the subscription order.

At 308, a notification is sent to the customer regarding the status of the provisioned order. Additional description related to performing steps 302, 304, 306 and 308 is provided in detail in FIG. 3B.

Figure 3B:
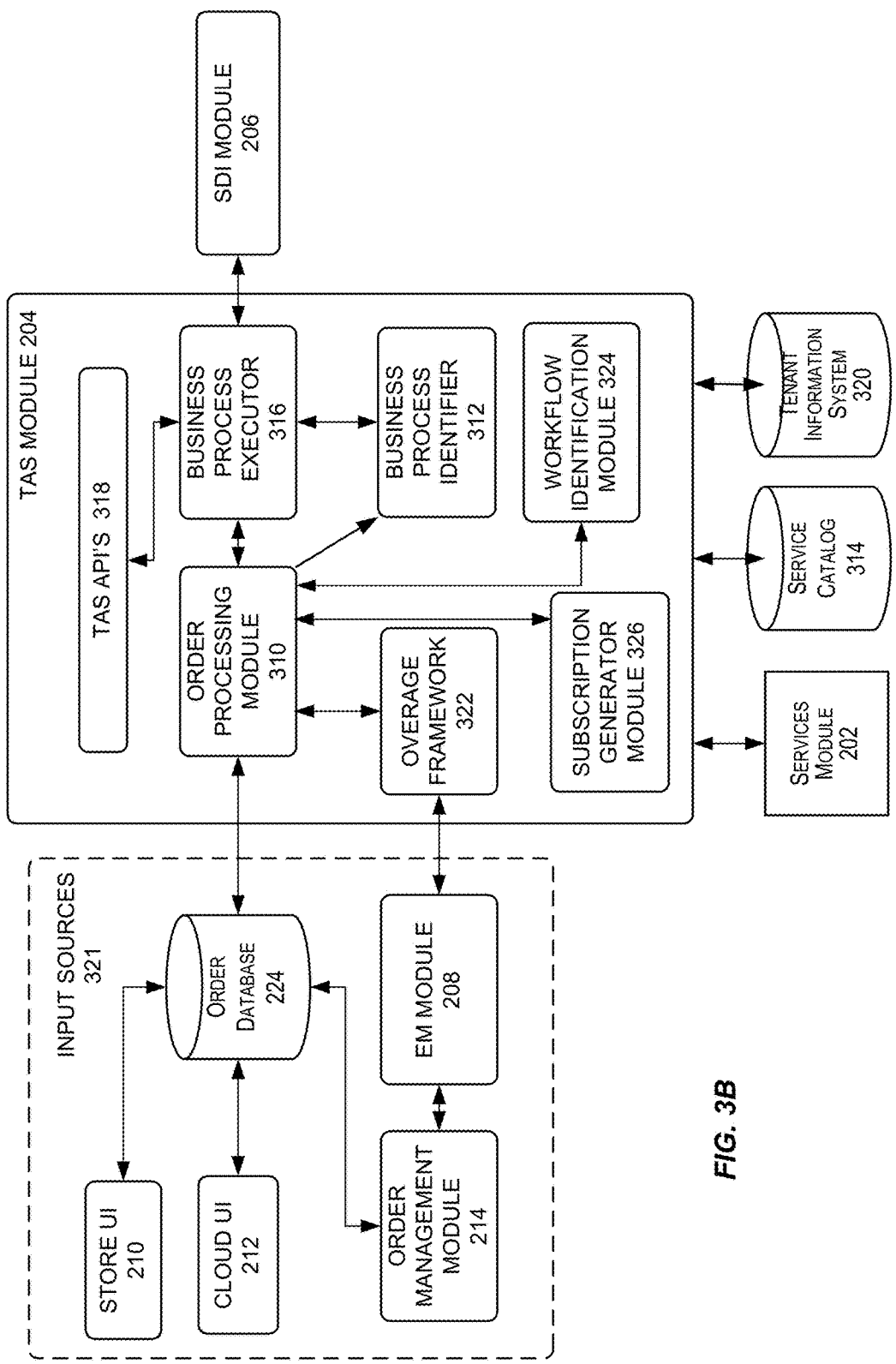
FIG. 3B depicts a simplified high level diagram of one or more sub-modules in the TAS module in the cloud infrastructure system, in accordance with an embodiment of the present invention.

FIG. 3B depicts a simplified high level diagram of one or more sub-modules in the TAS module in the cloud infrastructure system, in accordance with an embodiment of the present invention. In one embodiment, the modules depicted in FIG. 3B perform the processing described in steps 302-308 discussed in FIG. 3A. In the illustrated embodiment, TAS module 204 comprises an order processing module 310, a business process identifier 312, a business process executor 316, an overage framework 322, a workflow identification module 324, and a bundled subscription generator module 326. These modules may be implemented in hardware, or software, or combinations thereof. The various modules of the TAS module depicted in FIG. 3B are meant for illustrative purposes only and are not intended to limit the scope of embodiments of the present invention. Alternative embodiments may include more or fewer modules than those shown in FIG. 3B.

In one embodiment, order processing module 310 receives an order from a customer from one or more input sources 321. For example, order processing module 310 may directly receive an order via cloud UI 212 or store UI 210, in one embodiment. Alternatively, order processing module 310 may receive an order from order management module 214 or order database 224. Order processing module 310 then processes the order. In certain embodiments, processing the order includes generating a customer record which includes information about the order such as a service type, a service level, a customer level, the type of resources, the amount of the resources to be allocated to the service instance and a time period during which the service is desired. As part of the processing, order processing module 310 also determines whether the order is a valid order. This includes ensuring that the customer does not already have subscriptions with the same name or that the customer is not attempting to create multiple subscriptions of the same type in the same identity domain for subscription types where this is disallowed (such as, in the case of a fusion CRM service).

Order processing module 310 may also perform additional processing on the order. Processing may include tracking the status of an order for each order that is being processed by cloud infrastructure system 100. In one embodiment, order processing module 310 may process each order to identify a number of states pertaining to the order. In one example, the different states of an order may be an initialized state, a provisioned state, an active state, an administration required state, an error state, and the like. An initialized state refers to the state of a new order; a provisioned state refers to the state of an order once the services and resources for the order have been provisioned. An order is in an active state when the order has been processed by TAS module 204 and a notification to that effect has been delivered to the customer. An order is in an administration required state when intervention by an administrator is needed to resolve the issue. The order is in an error state when the order cannot be processed. In addition to maintaining the order progress status, order processing module 310 also maintains detailed information about any failures encountered during process execution. In other embodiments, and as will be discussed in detail below, the additional processing performed by order processing module 310 may also include changing the service level for a service in the subscription, changing the services included in the subscription, extending the time period of the subscription, and canceling the subscription or specifying different service levels for different time periods in the subscription.

After an order has been processed by order processing module 310, business logic is applied to determine whether the order should proceed to provisioning. In one embodiment, as part of orchestrating the order, business process identifier 312 receives the processed order from order processing module 310 and applies business logic to identify a particular business process to use for the order being processed. In one embodiment, business process identifier 312 may utilize information stored in a service catalog 314 to determine the particular business process to be used for the order. In one embodiment, and as discussed in FIG. 3A, multiple business processes may be identified for an order and each business process identifies a series of steps for processing various aspects of the order. In another embodiment, and as discussed above, different business processes may be defined for different types of services, or combinations of services such as a CRM service or a database service. In one embodiment, service catalog 314 may store information mapping an order to a particular type of business process. Business process identifier 312 may use this information to identify a specific business process for the order being processed.

Once a business process has been identified, business process identifier 312 communicates the particular business process to be executed to business process executor 316. Business process executor 316 then executes steps of the identified business process by operating in conjunction with one or more modules in the cloud infrastructure system 100. In some embodiments, business process executor 316 acts as an orchestrator for performing the steps associated with a business process. For example, the business process executor may interact with order processing module 310 to execute steps in a business process that identifies workflows related to the order, determines the overage of services in the order or identifies service components related to the order.

In one example, business process executor 316 interacts with SDI module 206 to execute steps in a business process for allocating and provisioning resources for services requested in the subscription order. In this example, for each step in the business process, business process executor 316 may send a request to SDI component 206 to allocate resources and configure resources needed to fulfill the particular step. SDI component 206 is responsible for the actual allocation of the resources. Once all the steps of the business processes of an order have been executed, business process executor 316 may send a notification to the customer of the processed order by utilizing the services of services component 202. The notification may include sending an email notification to the customer with details of the processed order. The email notification may also include deployment information related to the order to enable the customer to access the subscribed services.

In certain embodiments, TAS module 204 may provide one or more TAS Application Programming Interfaces (APIs) 318 that enable TAS module 204 to interact with other modules in cloud infrastructure system 100 and for other modules to interact with TAS module 204. For example, the TAS APIs may include a system provisioning API that interacts with SDI module 206 via an asynchronous Simple Object Access Protocol (SOAP) based web services call to provision resources for the customer's subscription order. In one embodiment, TAS module 204 may also utilize the system provisioning API to accomplish system and service instance creation and deletion, switch a service instance to an increased service level, and associate service instances. An example of this is the association of a Java service instance to a fusion applications service instance to allow secure web service communications. The TAS APIs may also include a notification API that interacts with the services module 202 to notify the customer of a processed order. In certain embodiments, the TAS module 204 also periodically propagates subscription information, outages, and notifications (e.g. planned downtime) to services component 202.

In certain embodiments, TAS module 204 periodically receives usage statistics for each of the provisioned services such as the amount of storage used, the amount data transferred, the number of users, and the amount of system up time and system down time from EM module 208. Overage framework 322 utilizes the usage statistics to determine whether over use of a service has occurred, and if so, to determine how much to bill for the overage, and provides this information to order management module 214.

In certain embodiments, TAS module 204 includes an order workflow identification module 324 that is configured to identify one or more workflows associated with processing a customer's subscription order. In certain embodiments, TAS module 204 may include a subscription order generation framework 326 for generating subscription orders for a customer when the customer places a subscription order for one or more services offered by the cloud infrastructure system 100. In one embodiment, a subscription order includes one or more service components responsible for providing the services requested by a customer in the subscription order.

Additionally, TAS module 204 may also interact with one or more additional databases such as a Tenant Information System (TIS) database 320 to enable the provisioning of resources for one or more services subscribed by the customer while taking into consideration historical information, if any, available for the customer. TIS database 320 may include historical order information and historical usage information pertaining to orders subscribed by the customer.

TAS module 204 may be deployed using different deployment models. In certain embodiments, the deployment includes a central component that interfaces with one or more distributed components. The distributed components may, for example, be deployed as various data centers and accordingly may also be referred to as data center components. The central component includes capabilities to process orders and co-ordinate services in cloud infrastructure system 100, while the data center components provide capabilities for provisioning and operating the runtime system that provides the resources for the subscribed services.

Figure 4:
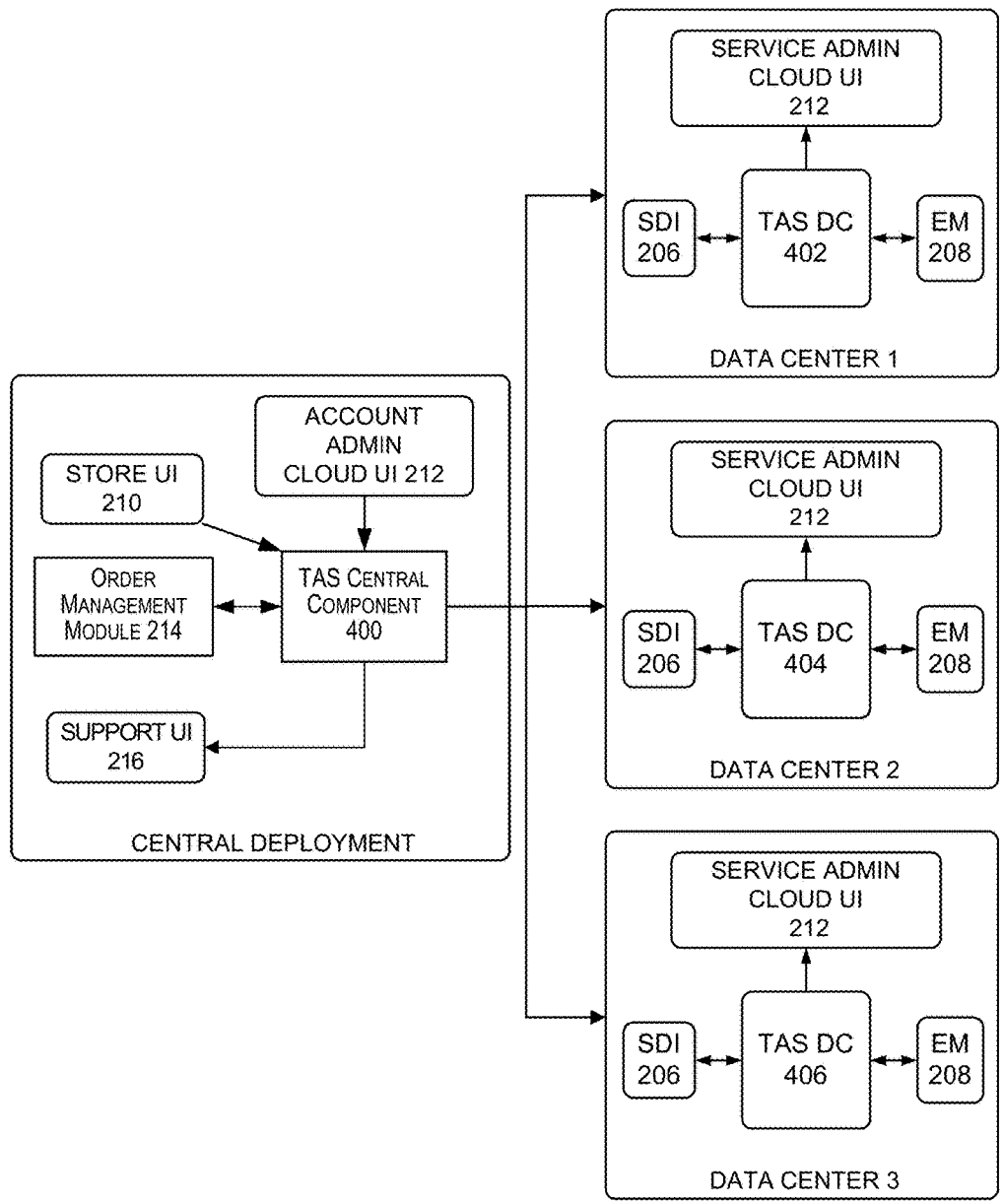
FIG. 4 depicts an exemplary distributed deployment of the TAS component, according to an embodiment of the present invention.

FIG. 4 depicts an exemplary distributed deployment of the TAS module, according to an embodiment of the present invention. In the embodiment depicted in FIG. 4, the distributed deployment of TAS module 204 includes a TAS central component 400 and one or more TAS Data Centers (DCs) components 402, 404 and 406. These components may be implemented in hardware, or software, or combinations thereof.

In one embodiment, the responsibilities of TAS central component 400 include, without limitation, to provide a centralized component for receiving customer orders, performing order-related business operations such as creating a new subscription, changing the service level for a service in the subscription, changing the services included in the subscription, and extending the time period of the subscription, or canceling the subscription. The responsibilities of TAS central component 400 may also include maintaining and serving subscription data needed by cloud infrastructure system 100 and interfacing with order management module 214, support UI 216, cloud UI 212 and store UI 210 to handle all the back-office interactions.

In one embodiment, the responsibilities of TAS DCs 402, 404 and 406 include, without limitation, performing runtime operations for orchestrating the provisioning the resources for one or more services subscribed by the customer. TAS DCs 402, 404 and 406 also include capabilities to perform operations such as locking, unlocking, enabling, or disabling a subscription order, collecting metrics related to the order, determining the status of the order, and sending notification events related to the order.

In an exemplary operation of the distributed TAS system shown in FIG. 4, TAS central component 400 initially receives an order from a customer via cloud UI 212, store UI 210, via order management system 214, or via order database 224. In one embodiment, the customer represents a buyer who has financial information and the authority to order and/or change a subscription. In one embodiment, the order information includes information identifying the customer, the type of services that the customer wishes to subscribe to, and an account administrator who will be responsible for handling the request. In certain embodiments, the account administrator may be nominated by the customer when the customer places an order for a subscription to one or more services offered by cloud infrastructure system 100. Based on the order information, the TAS central component 400 identifies the data region of the world such as Americas, EMEA, or Asia Pacific in which the order originates and the particular TAS DCs (for e.g., 402, 404 or 406) that will be deployed for provisioning the order. In one embodiment, the particular TAS DC (for e.g., from among DCs 402, 404 or 406) that will be deployed for provisioning the order is determined based on the geographical data region in which the request originated.

TAS central component 400 then sends the order request to the particular TAS DC in which to provision services for the order request. In one embodiment, TAS DCs 402, 404 or 406 identify a service administrator and an identity domain administrator responsible for processing the order request at the particular TAS DC. The service administrator and the identity administrator may be nominated by the account administrator identified in the subscription order. TAS DCs 402, 404 or 406 communicate with SDI module 204 to orchestrate the provisioning of physical resources for the order. SDI component 204 in respective TAS DCs 402, 404 or 406 allocates resources and configures those resources needed to fulfill the subscription order.

In certain embodiments, TAS DCs, 402, 404 or 406 identify an identity domain associated with the subscription. SDI component 206 may provide the identity domain information to IDM component 200 (shown in FIG. 2) for identifying an existing identity domain or creating a new identity domain. Once the order is provisioned by the SDI module at respective TAS DCs, 402, 404 or 406, TAS central component 400 may place information regarding the provisioned resources in a support system, via support UI 216. Information may include, for example, displaying resource metrics related to the services and usage statistics of the services.

Once in operation, at each data center, EM module 208 to periodically collects usage statistics for each of the provisioned services provisioned at that data center, such as the amount of storage used, the amount data transferred, the number of users, and the amount of system up time and system down time. These statistics are provided to the TAS DC that is local to EM module 208 (i.e., at the same data center). In an embodiment, the TAS DCs may use the usage statistics to determine whether overuse of a service has occurred, and if so, to determine how much to bill for the overage, and provide the billing information to order management system 214.

Figure 5:
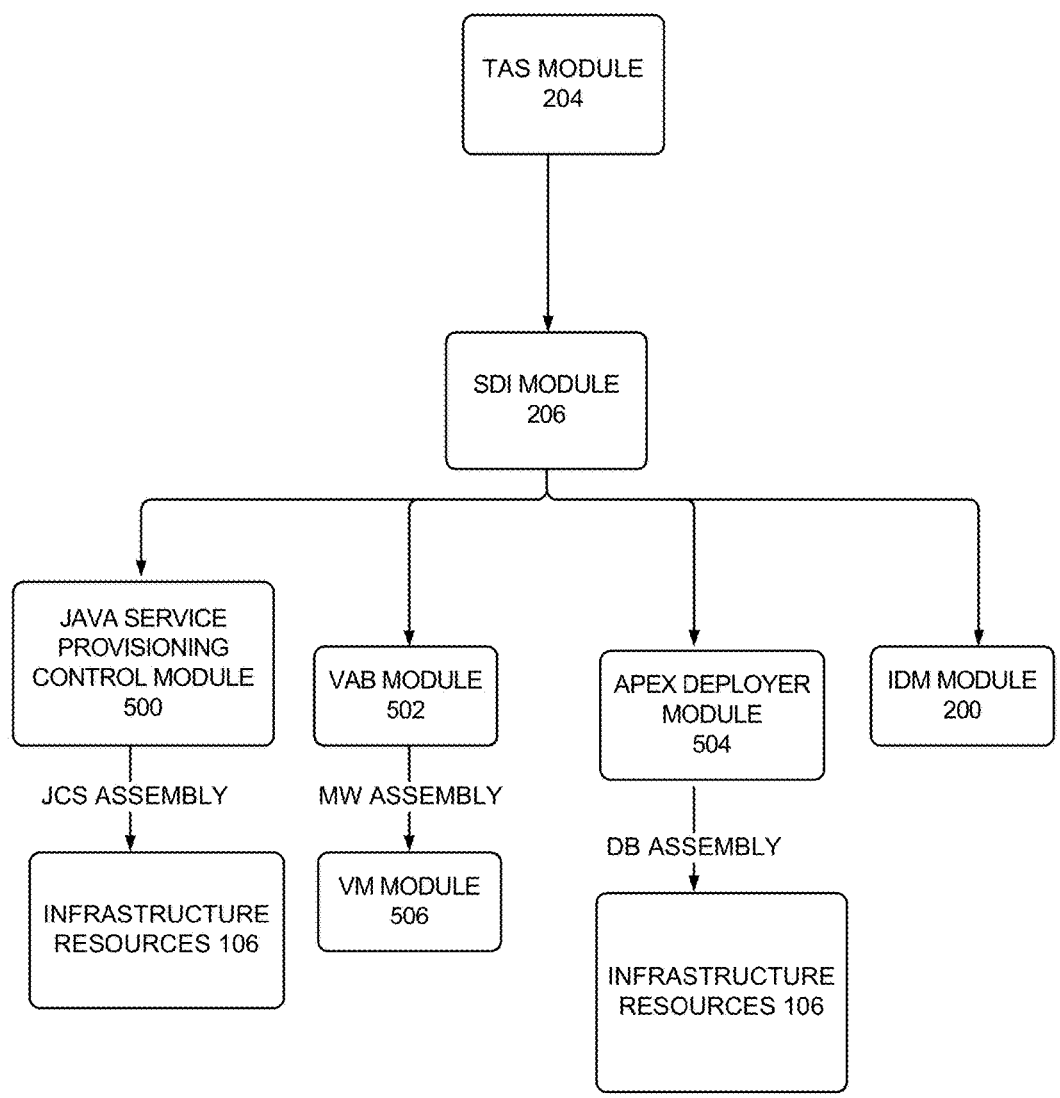
FIG. 5 is a simplified block diagram illustrating the interactions of the SDI module with one or more modules in the cloud infrastructure system, in accordance with an embodiment of the present invention.

FIG. 5 is a simplified block diagram illustrating the interactions of the SDI module with one or more modules in the cloud infrastructure system, in accordance with an embodiment of the present invention. In one embodiment, SDI module 206 interacts with TAS module 204 to provision resources for services in a subscription order received by TAS module 204. In certain embodiments, one or more of the modules illustrated in FIG. 5 may be modules within cloud infrastructure system 100. In other embodiments, one or more of the modules that interact with SDI module 206 may be outside cloud infrastructure system 100. In addition, alternative embodiments may have more or less modules than those shown in FIG. 5. These modules may be implemented in hardware, or software, or combinations thereof.

In one embodiment, the modules in SDI module 206 may include one or more modules in SaaS platform 102 and PaaS platform 104 in cloud infrastructure system 100. In order to perform provisioning of resources for various services, SDI module 206 may interact with various other modules, each customized to help with provisioning resources for a particular type of service. For example, as illustrated in FIG. 5, SDI module 206 may interact with a Java service provisioning control module 500 to provision Java cloud services. In one embodiment, Java service provisioning control component 500 may deploy a Java Cloud Service (JCS) assembly specified by SDI module 206 that includes a set of tasks to be performed to provision Java cloud services. Infrastructure resources 106 then determines the resources needed to provision the Java cloud services.

As other examples, SDI module 206 may interact with one or more modules such as a Virtual Assembly Builder (VAB) module 502, an Application Express (APEX) deployer module 504, a Virtual Machine (VM) module 506, an IDM module 200, and a database machine module 118. VAB module 502 includes capabilities to configure and provision complete multi-tier application environments. In one embodiment, VAB module 502 deploys a Middleware (MW) service assembly specified by SDI module 206 to provision a MW service in cloud infrastructure system 100 using the services provided by VM module 506. APEX deployer module 504 includes capabilities to configure and provision database services. In one embodiment, APEX deployer module 504 deploys a database service assembly specified by SDI module 206 to provision a database service in cloud infrastructure system 100 using the resources provided by infrastructure resources 106. SDI module 206 interacts with IDM module 200 to provide identity services such as access management across multiple applications in cloud infrastructure system 100.

Figure 6:
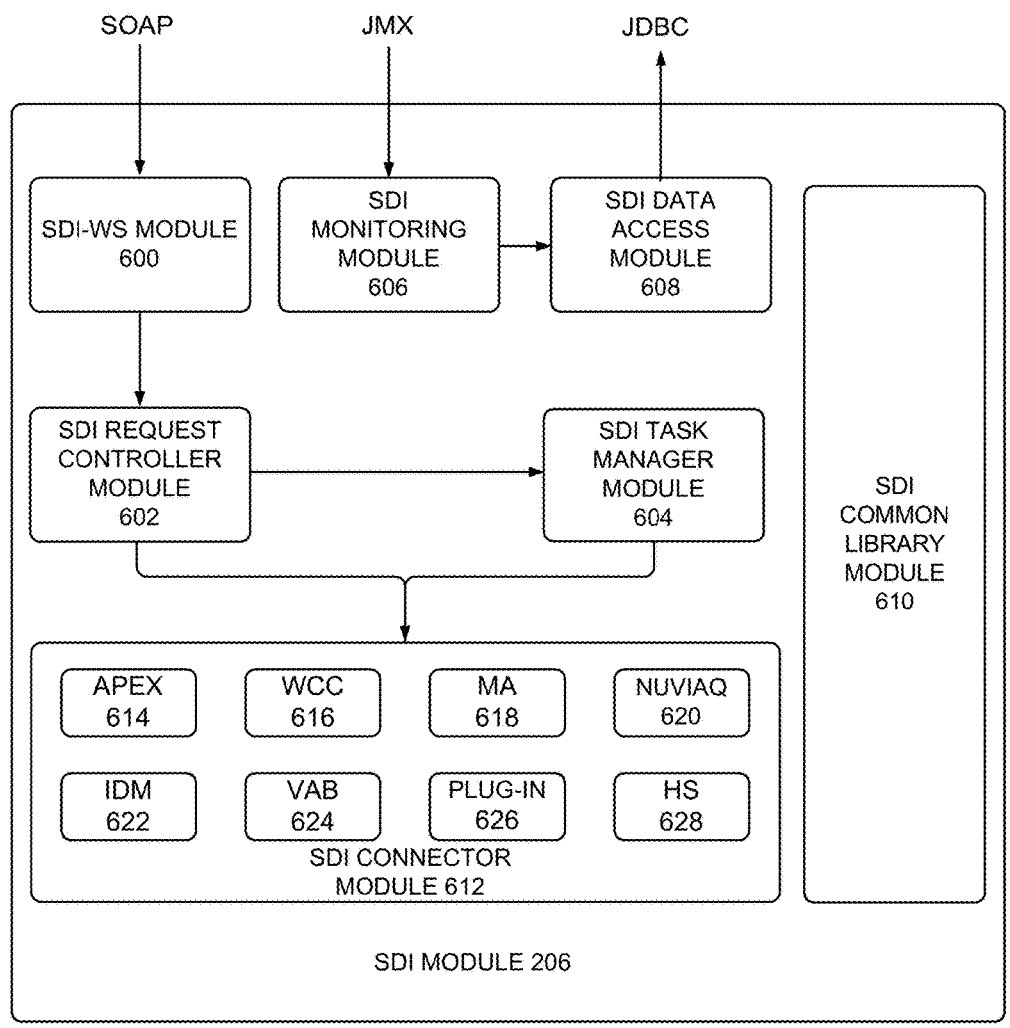
FIG. 6 depicts a simplified high level diagram of sub-modules of the SDI module according to an embodiment of the present invention.

FIG. 6 depicts a simplified high level diagram of sub-modules of the SDI module according to an embodiment of the present invention. In the embodiment depicted in FIG. 6, SDI module 206 includes a SDI-Web Services (WS) module 600, an SDI request controller module 602, an SDI task manager module 604, an SDI monitoring module 606, an SDI data access module 608, an SDI common library module 610, and an SDI connector module 612. These modules may be implemented in hardware, or software, or combinations thereof. SDI module 206 depicted in FIG. 6 and its various modules are meant for illustrative purposes only and are not intended to limit the scope of embodiments of the present invention. Alternative embodiments may have more or less modules than those shown in FIG. 6. These modules and their functions are described in detail below.

SDI-WS module 600 includes capabilities for receiving a step in the business associated with an order from business process executor 316 of TAS component 204. In one embodiment, SDI-WS module 600 parses each step of the business process and converts the step into an internal representation used by SDI module 206. In one embodiment, each step of the business process associated with the order arrives through a web service processing layer (for example, via System Provisioning API discussed in FIG. 3B) in the form of a SOAP request to SDI-WS module 600.

SDI request controller module 602 is the internal request processing engine in SDI module 206 and includes capabilities for performing asynchronous request processing, concurrent request processing, concurrent task processing, fault tolerant and recovery and plug-in support related to the order requests. In one embodiment, SDI request controller module 602 accepts each step of the business process associated with the order from SDI-WS module 600 and submits the step to SDI task manager module 604.

SDI task manager module 604 translates each step specified in the business process into a series of tasks for provisioning the particular step. Once the set of tasks for a specific step have been provisioned, SDI task manager module 604 responds to business process executor 316 in TAS module 204 with operation results that includes an order payload with details of the resources provisioned to fulfill the particular step. SDI task manager module 604 repeats this process until all the steps of the particular business process associated with the order are complete.

In certain embodiments, SDI task manager module 604 translates each step specified in the business process into a series of tasks by utilizing the services of SDI connector module 612. SDI connector module 612 includes one or more connectors for handling the deployment of tasks specified by SDI task manager module 604 to provision one or more services related to the order request. In certain embodiments, one or more of the connectors may handle tasks that are specific to a particular service type while other connectors may handle tasks that are common across different service types. In one embodiment, SDI connector module 612 includes a set of connectors (wrapper APIs) that interface with one or more of the external modules (shown in FIG. 5) in cloud infrastructure system 100 to provision the services and resources related to the order request. For example, Application Express (APEX) connector 614 interfaces with APEX deployer module 504 to provision database services. Web Center Connector 616 (WCC) interfaces with a web center module in cloud infrastructure system 100 to provision web services. The web center module is a user engagement platform and includes capabilities for delivering connectivity between people and information in cloud infrastructure system 100.

In certain embodiments, Middleware Applications (MA) connector 618 interfaces with VAB module 502 in cloud infrastructure system 100 to provision middleware application services. NUVIAQ connector 620 interfaces with VAB module 502 to provision Java services. IDM connector 622 interfaces with IDM module 200 to provide identity and access management for users subscribing to services and resources in cloud infrastructure system 100. Virtual Assembly Builder (VAB) connector 624 interfaces with VAB module 502 in cloud infrastructure system 100 to configure and provision complete multi-tier application environments. Plug-in connector 626 interfaces with EM module 208 to manage and monitor the components in cloud infrastructure system 100. HTTP server connector 628 interfaces with one or more web servers in the PaaS platform to provide connection services to users in cloud infrastructure system 100.

SDI monitoring module 606 in SDI module 206 provides an inbound interface for receiving Java Management Extensions (JMX) requests. SDI monitoring module 606 also provides tools for managing and monitoring applications, system objects and devices in cloud infrastructure system 100. SDI-data access module 608 provides an inbound interface for receiving Java Database Connectivity (JDBC) requests. SDI-data access module 608 supports data access and provides object relational mapping, java transaction API services, data access objects, and connection pooling in cloud infrastructure system 100. The SDI-common library module 610 provides configuration support for the modules in SDI module 206.

Figure 7A:
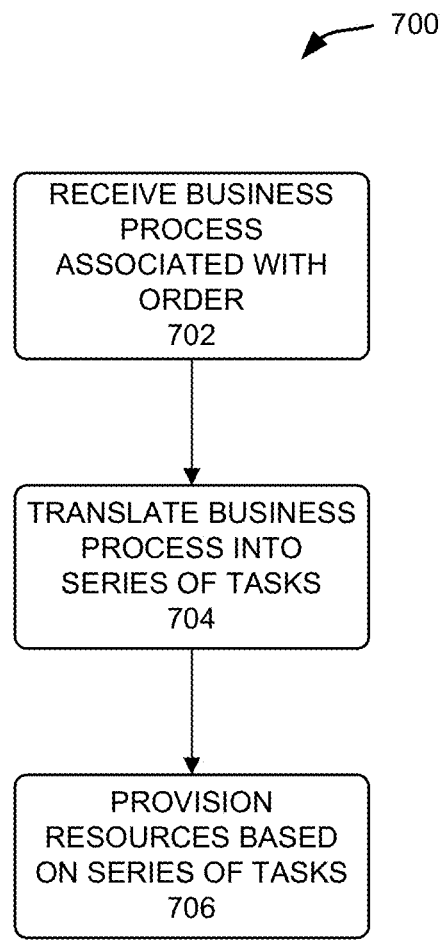
FIG. 7A depicts a simplified flowchart depicting processing that may be performed by the SDI component in the cloud infrastructure system, in accordance with an embodiment of the present invention.

The embodiment of FIG. 6 discussed above describes modules in the SDI module according to an embodiment of the present invention. FIG. 7A depicts a simplified flowchart 700 depicting processing that may be performed by the modules of the SDI module in the cloud infrastructure system, in accordance with an embodiment of the present invention. The processing depicted in FIG. 7A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 7A is not intended to be limiting. Other sequences of steps may also be performed according to alternative embodiments. For example, alternative embodiments of the present invention may perform the steps outlined above in a different order. Moreover, the individual steps illustrated in FIG. 7A may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 7A may be performed by one or more modules in the SDI module 206 discussed in detail in FIG. 6.

At 702, a business process associated with a subscription order is received. In one embodiment, SDI-WS module 600 in SDI module 206 receives one or more steps in the business process associated with the subscription order from business process executor 316. At 704, each step in the business process is translated into a series of tasks for provisioning resources for the subscription order. In one embodiment, SDI task manager module 604 in SDI module 206 translates each step specified in the business process into a series of tasks by utilizing the services of SDI connector module 612. At 706, the subscription order is provisioned based on the series of tasks. In one embodiment, and as discussed in FIG. 6, SDI connector module 612 includes one or more connectors for handling the deployment of tasks specified by SDI task manager module 604 to provision resources for the services in the subscription order.

As described above with respect to FIG. 6, SDI task manager module 604 translates each step specified in a business process into a series of tasks by utilizing the services of SDI connector module 612, which may include one or more connectors for handling the deployment of tasks specified by SDI task manager module 604 to provision one or more services related to the order request. One or more of the connectors may handle tasks that are specific to a particular service type while other connectors may handle tasks that are common across different service types. In one embodiment, SDI connector module 612 includes a set of connectors (wrapper APIs) that interface with one or more of the external modules (shown in FIG. 5) in cloud infrastructure system 100 to provision the services and resources related to the order request. For example, a NUVIAQ connector 620 interfaces with VAB module 502 to provision Java services.

Figure 7B:
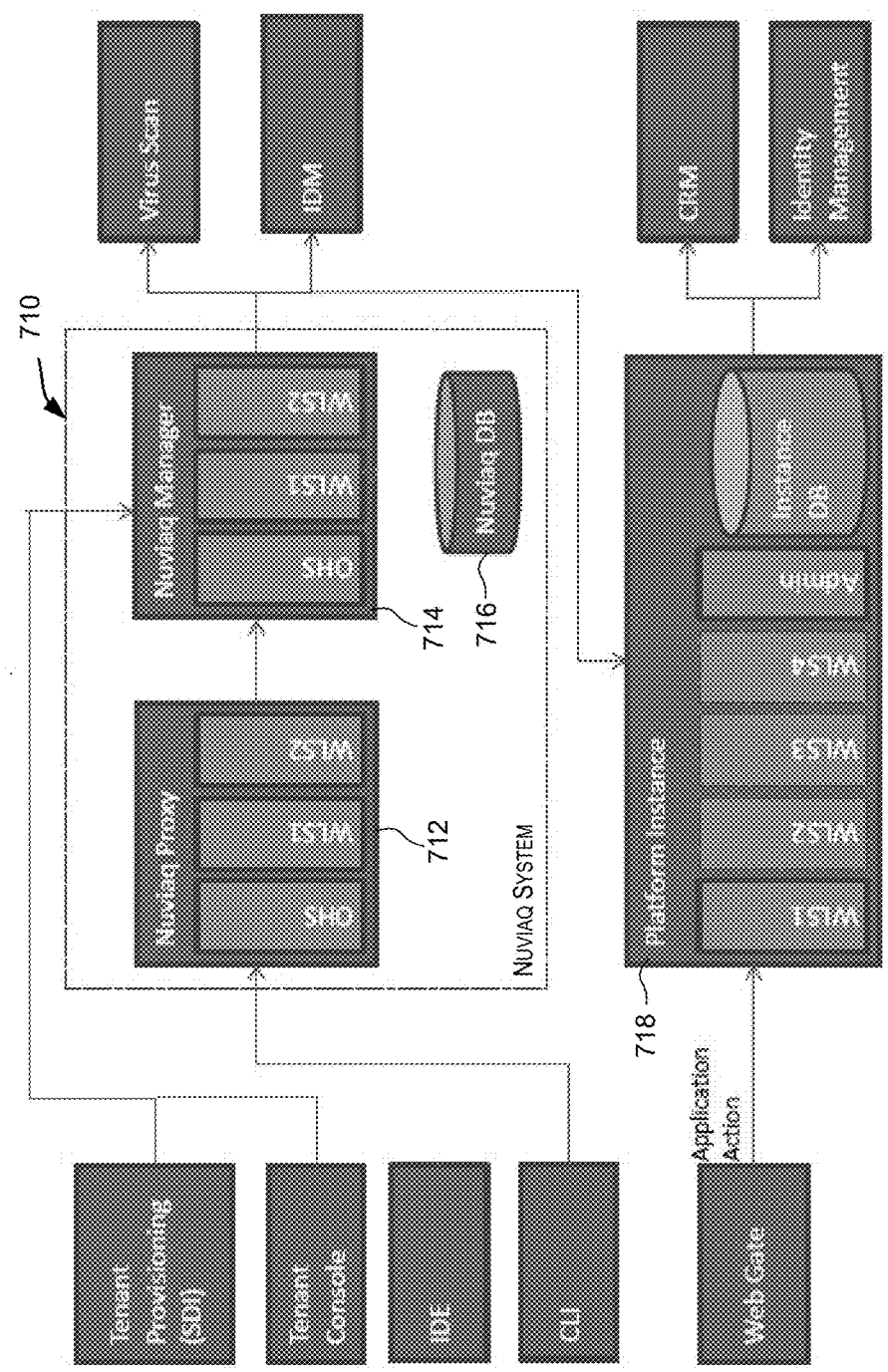
FIG. 7B depicts a simplified block diagram showing the high-level architecture of a Nuviaq system 710 and its relationships with other cloud infrastructure components according to an embodiment of the present invention.

FIG. 7B depicts a simplified block diagram showing the high-level architecture of a Nuviaq system 710 and its relationships with other cloud infrastructure components according to an embodiment of the present invention. It should be appreciated that Nuviaq system 710 depicted in FIG. 7B may have other components than those depicted in FIG. 7B. Further, the embodiment shown in FIG. 7B is only one example of a cloud infrastructure system that may incorporate an embodiment of the invention. In some other embodiments, Nuviaq system 710 may have more or fewer components than shown in FIG. 7B, may combine two or more components, or may have a different configuration or arrangement of components.

In certain embodiments, Nuviaq system 710 may be configured to provide a runtime engine for orchestrating PaaS operations. Nuviaq system 710 may provide a web service API to facilitate integration with other products and services. Nuviaq system 710 also provides support for complex workflows in system provisioning, application deployment and associated lifecycle operations and integrates with management and monitoring solutions.

In the embodiment depicted in FIG. 7B, Nuviaq system 710 comprises a Nuviaq proxy 712, a Nuviaq manager 714, and a Nuviaq database 716. In certain embodiments, Nuviaq manager 714 provides an entry point into Nuviaq system 710, providing secure access to PaaS operations via the web service API. Internally, it tracks system state in the database and controls job execution on the workflow engine. In a public cloud, Nuviaq manager 714 may be accessed by the Tenant Provisioning system (SDI 206) and the Tenant Console, to drive provisioning and deployment operations respectively.

In one embodiment, Nuviaq manager 714 executes jobs asynchronously via an internal workflow engine. A job may be a sequence of actions specific to a given PaaS workflow. Actions may be performed in order, with failure in any step resulting in failure of the overall job. Many workflow actions delegate to external systems relevant to the workflow, such as the EM command line interface (cli). In one implementation, Nuviaq manager 714 application may be hosted in a 2-node WebLogic cluster with associated HTTP server (e.g., Oracle HTTP Server or OHS) instance, running inside a firewall.

In certain embodiments, Nuviaq proxy 712 is the public access point to the Nuviaq API. In one embodiment, only Public API may be exposed here. Requests received by proxy 712 may be forwarded to Nuviaq manager 714. In one embodiment, Nuviaq proxy 712 runs outside the firewall, whereas manager 714 runs within the firewall. In one implementation, Nuviaq proxy 712 application runs on a WebLogic cluster running outside the firewall.

In certain embodiments, Nuviaq database 716 tracks various domain entities such as, without limitation, platform instance, deployment plan, application, WebLogic domain, jobs, alerts, and the like. Primary keys may be aligned with the Service Database where appropriate.

In one embodiment, Platform Instance 718 may contain all resources required for a WebLogic service for a given tenant.

Nuviaq system 710 may rely on additional systems of cloud infrastructure system 100 to carry out the workflows used the WebLogic cloud service. These dependencies may include dependencies on SDI 206, IDM 200, a virus scan system, a service database, CRM instances, and the like. For example, Nuviaq system 710 may depend upon functions performed by an Assembly Deployer in SDI 206. In one embodiment, the Assembly Deployer is a system to manage interactions with OVAB (Oracle Virtual Assembly Builder) and OVM (Oracle Virtual Machine). Capabilities of the Assembly Deployer used by Nuviaq system 710 may include, without limitation, functions for deploying an assembly, un-deploying an assembly, describing assembly deployment, scaling appliance, and the like. In one implementation, Nuviaq system 710 accesses the Assembly Deployer via a web service API.

In certain embodiments, security policies may require certain artifacts to be scanned for viruses before being deployed to an application. Cloud infrastructure system 100 may provide a virus scan system for this purpose that provides scanning as a service for multiple components of the public cloud.

In certain embodiments, a public cloud infrastructure may maintain a Service Database containing information about tenants (e.g., customers) and their service subscriptions. Nuviaq workflows may access to this data in order to properly configure a WebLogic service as a client to other services that the tenant also subscribes to.

Nuviaq system 710 may depend on IDM 200 for its security integration. In certain embodiments, Java Service instances can be associated with a CRM instance. The association allows user applications deployed to their Java Service instance to access a CRM instance though Web Service calls.

Various entities may use services provided by Nuviaq system 710. These clients of Nuviaq system 710 may include: a Tenant Console, which is an management server (e.g., Oracle Management Server) based user interface that customers may access to manage their applications on their platform instances; several IDEs such as Oracle IDEs (JDeveloper, NetBeans, and OEPE) have been extended to offer access to application lifecycle management operations; one or more Command Line Interfaces (CLIs) that are available to access lifecycle operations on the platform instances.

Provisioning use case for Nuviaq system 710—A Provision Platform Instance use case is realized via the Create Platform Instance operation of the Nuviaq API. In the context of cloud infrastructure system 100, a service instance with respect to the Nuviaq system corresponds to a Nuviaq platform instance. A platform instance is assigned a unique identifier is used on all subsequent operations related to this instance. A Platform Deployment descriptor provided to the Create Platform Instance action allows for properties to be set that modify the configuration of the platform instance to meet the subscription requirements of the tenant. These properties may include for example:

Property #1: oracle.cloud.service.weblogic.size
  Values: BASIC, STANDARD, ENTERPRISE
  Description: Specifies the subscription type. This impacts the number of servers, database limits and quality of service settings.
  Property #2: oracle.cloud.service.weblogic.trial
  Values: TRUE, FALSE
  Description: Indicates whether or not this is a trial subscription.
  Property #3: oracle.cloud.service.weblogic.crm
  Values: CRM Service ID
  Description: Identifies a CRM service to be associated with this WebLogic service instance.

Figure 7C:
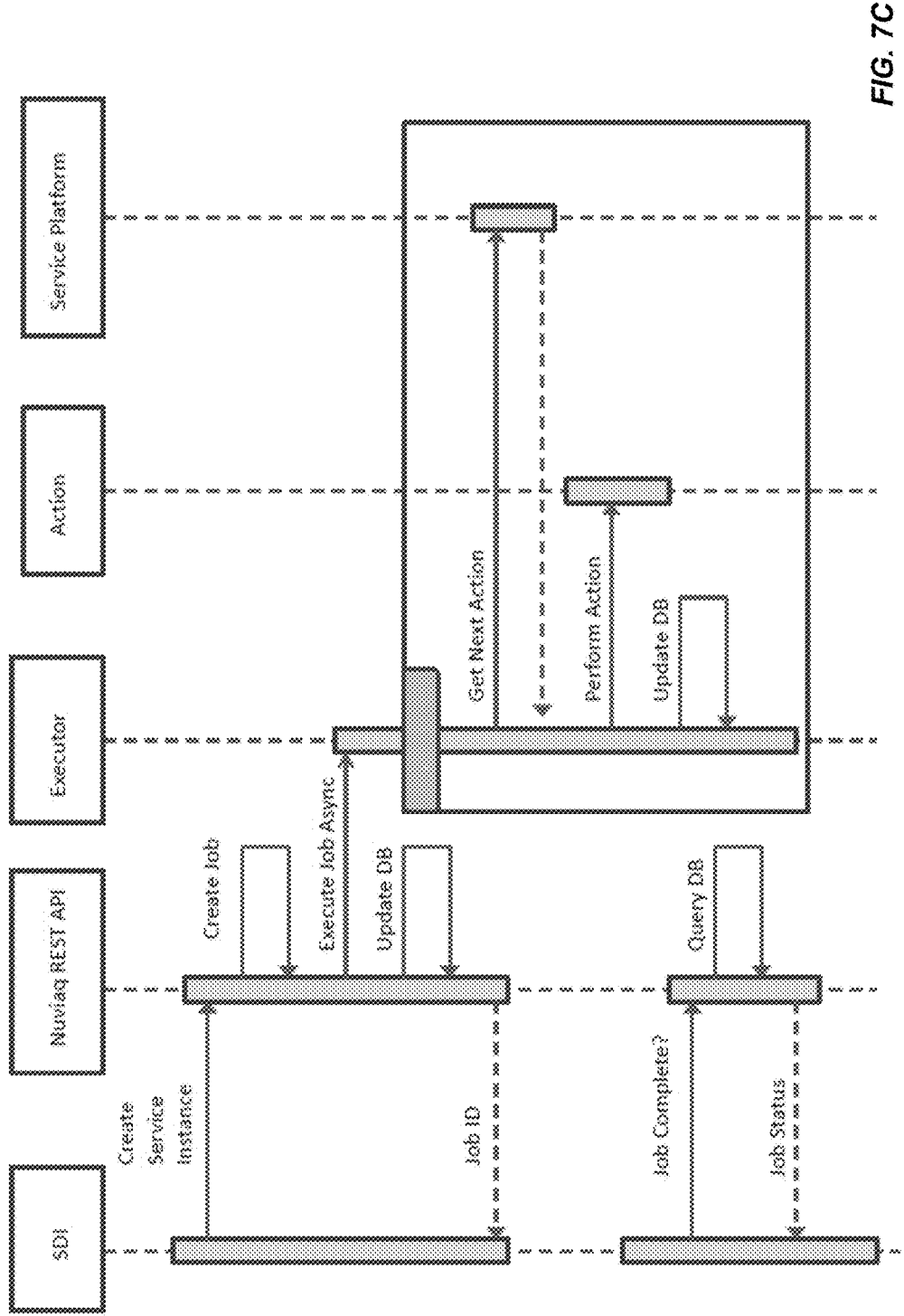
FIG. 7C depicts an example sequence diagram illustrating steps of a provisioning process using a Nuviaq system according to an embodiment of the present invention.

FIG. 7C depicts an example sequence diagram illustrating steps of a provisioning process using a Nuviaq system according to an embodiment of the present invention. The sequence diagram depicted in FIG. 7C is only an example and is not intended to be limiting.

Install/Update Application use case—The Install Application operation deploys an application to a running WebLogic Server after validating that the application archive meets the security requirements of the Public Cloud. In one embodiment, the Application Deployment descriptor provided to the Install Application action allows for properties to be set that modify the configuration of the application to meet the subscription requirements of the tenant. These properties may include for example:

Property: oracle.cloud.service.weblogic.state
  Values: RUNNING, STOPPED
  Description: Specifies the initial state of the application after deployment.

Figure 7D:
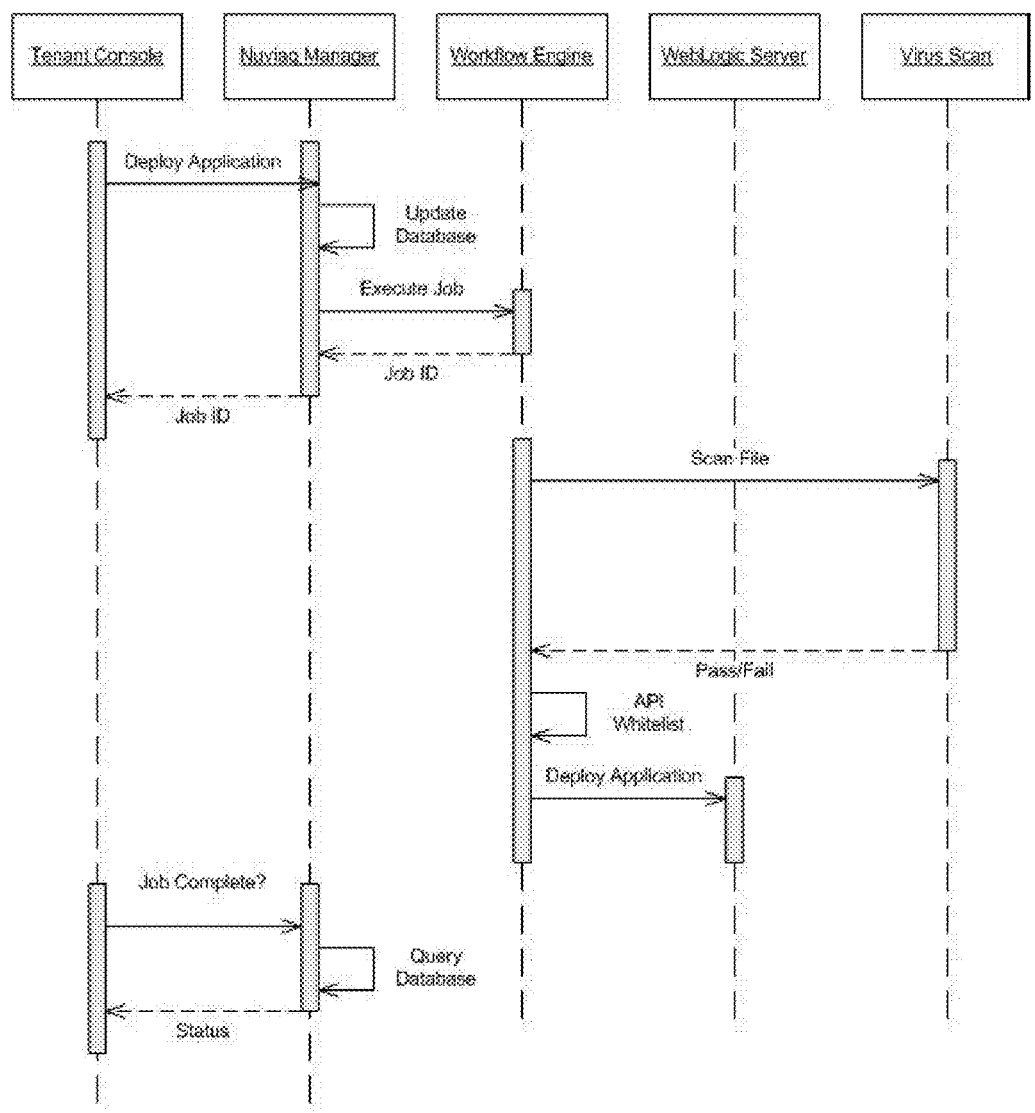
FIG. 7D depicts an example sequence diagram illustrating steps of a deployment process using a Nuviaq system according to an embodiment of the present invention.

FIG. 7D depicts an example sequence diagram illustrating steps of a deployment process using a Nuviaq system according to an embodiment of the present invention. The sequence diagram depicted in FIG. 7D is only an example and is not intended to be limiting.

Referring back to FIG. 2, in certain embodiments, TAS 204 and SDI 206 working in cooperation are responsible for provisioning resources for one or more services ordered by a customer from a set of services offered by cloud infrastructure system 100. For example, in one embodiment, for provisioning a database service, the automated provisioning flow may be as follows for a paid subscription:

(1) Customer places an order for a paid subscription to a service via Store UI 210.
(2) TAS 204 receives the subscription order.
(3) When services are available TAS 204 initiates provisioning by using the services of SDI 206. TAS 204 may perform business process orchestration, which will execute the relevant business process to complete the provisioning aspect of the order. In one embodiment, TAS 204 may use a BPEL (Business Process Execution Language) Process Manager to orchestrate the steps involved in the provisioning and handle the lifecycle operations.
(4) In one embodiment, to provision a database service, SDI 206 may call PLSQL APIs in the CLOUD_UI to associate a schema for the requesting customer.
(5) After successful association of a schema to the customer, SDI signals TAS and TAS send a notification to the customer that the database service is now available for use by the customer.
(6) The customer may log into cloud infrastructure system 100 (e.g., using an URAL such as cloud.oracle.com) and activate the service.

In some embodiments, a customer may also be allowed to subscribe to a service on a trial basis. For example, such a trial order may be received via cloud UI 212 (e.g., using cloud.oracle.com).

Figure 7E:
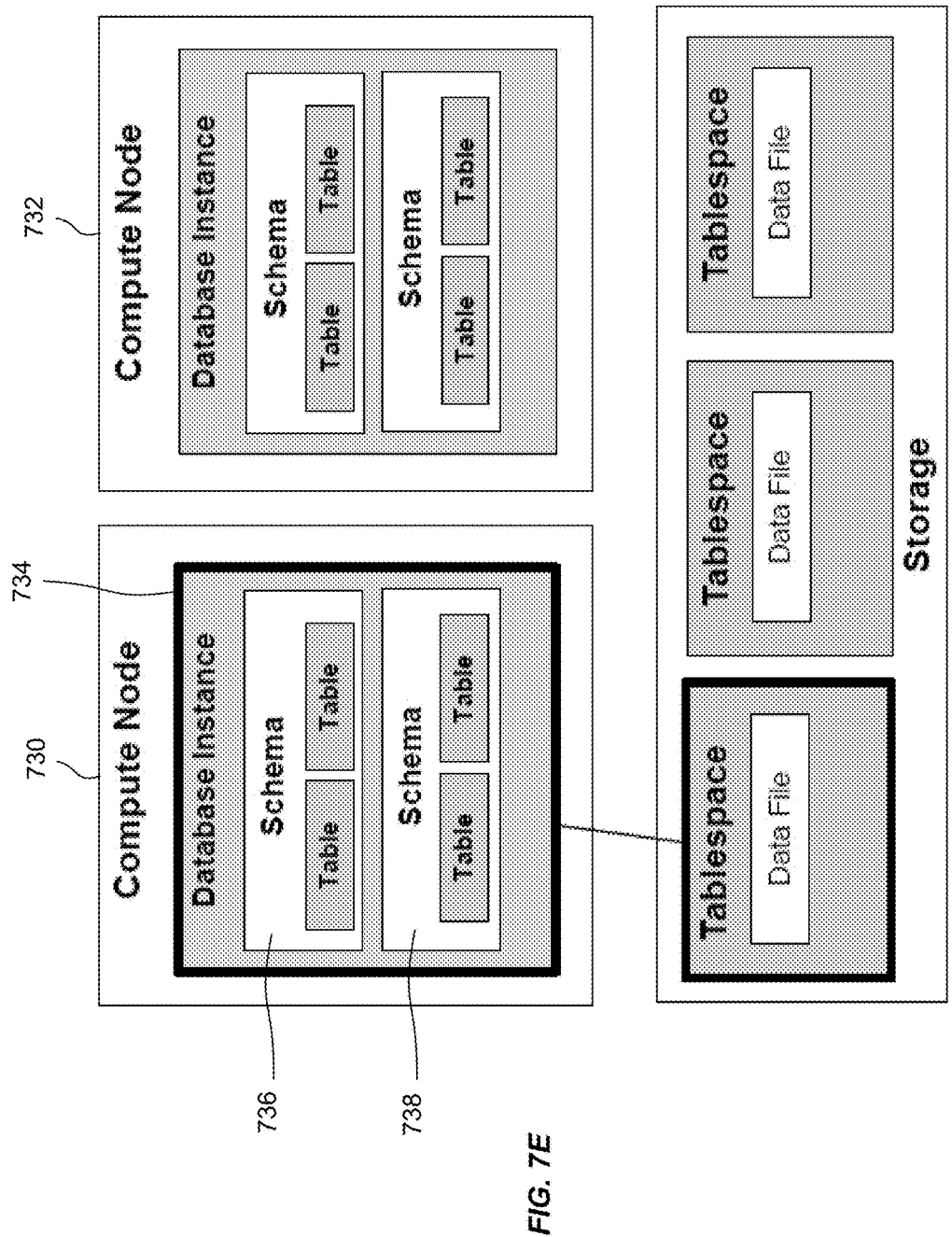
FIG. 7E depicts an example of database instances provisioned for a database service according to an embodiment of the present invention.

In certain embodiments, cloud infrastructure system 100 enables underlying hardware and service instances to be shared between customers or tenants. For example, the database service may be provisioned as shown in FIG. 7E in one embodiment. FIG. 7E depicts multiple Exadata compute nodes 730 and 732, each providing a database instance provisioned for the database service. For example, compute node 730 provides a database instance 734 for a database service. Each Exadata compute node may have multiple database instances.

In certain embodiments, each database instance can comprise multiple schemas and the schemas may be associated with different customers or tenants. For example, in FIG. 7E, database instance 734 provides two schemas 736 and 738, each with its own tables. Schema 736 may be associated with a first customer or tenant subscribing to a database service and schema 738 may be associated with a second customer or tenant subscribing to the database service. Each tenant gets a completely isolated schema. Each schema acts like a container that can manage database objects including tables, views, stored procedures, triggers, etc. for the associated tenant. Each schema may have one dedicated tablespace, with each tablespace having one data file.

In this manner, a single database instance can provide database services to multiple tenants. This not only enables sharing of underlying hardware resources but also enables sharing of service instance between tenants.

In certain embodiments, such a multi-tenancy system is facilitated by IDM 200, which beneficially enables multiple separate customers, each having their own separate identity domains, to use hardware and software that is shared in the cloud. Consequently, there is no need for each customer to have its own dedicated hardware or software resources, and in some cases resources that are not being used by some customers at a particular moment can be used by other customers, thereby preventing those resources from being wasted. For example, as depicted in FIG. 7E, a database instance can service multiple customers each with their respective identity domains. Although each such database service instance can be a separate abstraction or view of a single physical multi-tenant database system that is shared among the many separate identity domains, each such database service instance can have a separate and potentially different schema than each other database service instance has. Thus, the multi-tenant database system can store mappings between customer-specified database schemas and the identity domains to which those database schemas pertain. The multi-tenant database system can cause the database service instance for a particular identity domain to use the schema that is mapped to that particular identity domain.

The multi-tenancy can also be extended to other services such as the Java Service. For example, multiple customers can have a JAVA service instance placed within their respective identity domains. Each such identity domain can have a JAVA virtual machine, which can be viewed as being a virtual "slice" of hardware. In one embodiment, a job-monitoring service (e.g., Hudson) can be combined with a JAVA enterprise edition platform (e.g., Oracle WebLogic) in the cloud to enable each separate identity domain to have its own separate virtual "slice" of the JAVA enterprise edition platform. Such a job-monitoring service can, for example, monitor the execution of repeated jobs, such as building a software project or jobs run by an operating system's time-based job scheduler. Such repeated jobs can include the continuous building and/or testing of software projects. Additionally or alternatively, such repeated jobs can include the monitoring of executions of operating system-run jobs that are executed on machines that are remote from the machine on which the job-monitoring service executes.

Handling of Failures in the Provisioning of Services

According to some embodiments, TAS can implement methods for failure handling in the execution flow of provisioning operations on a per-service basis. Handling of errors can be dependent on the specific service being provisioned. Additionally, errors can be categories in different classification types. Therefore, corrective actions can be made based on the classification type of the error and the service being provisioned.

Figure 8:
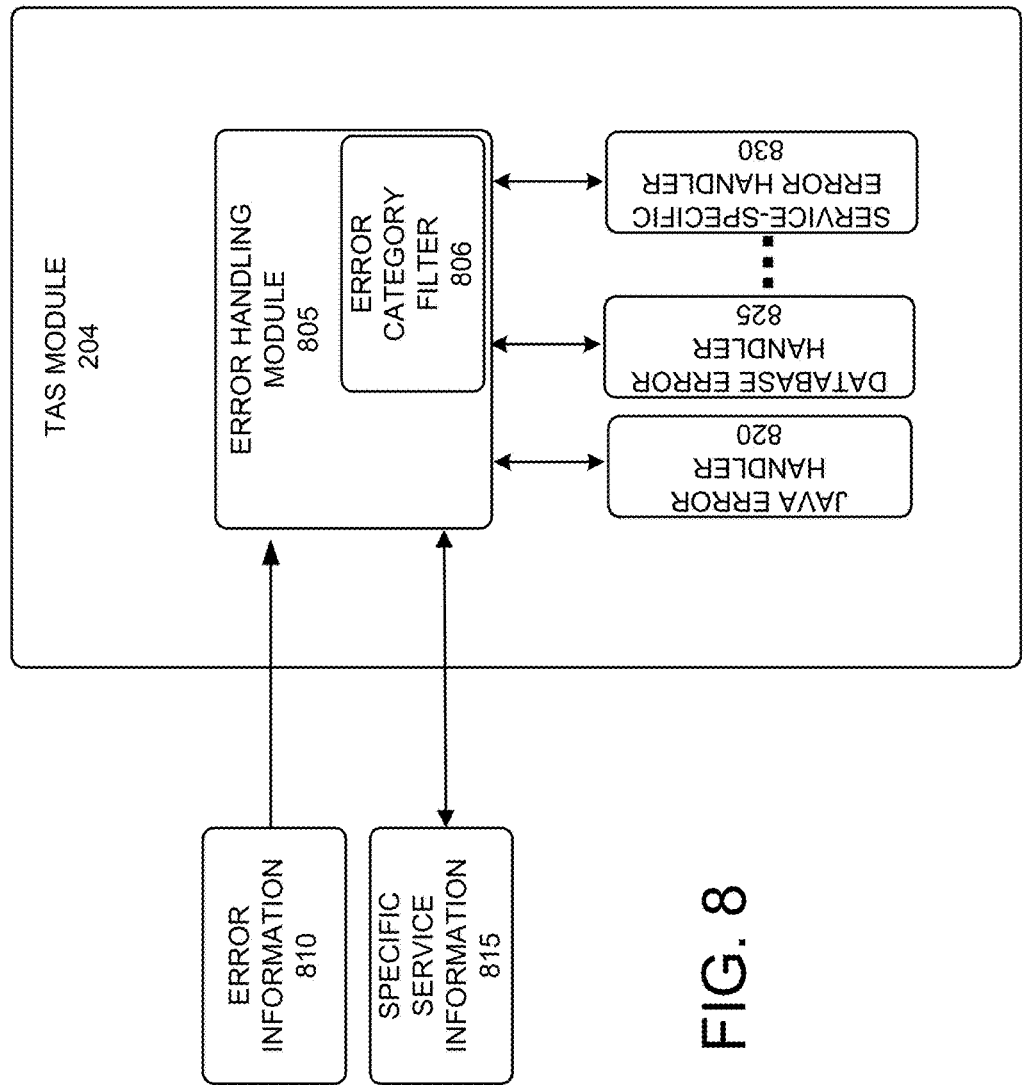
FIG. 8 depicts a simplified high level diagram of the components in the error handling module, according to some embodiments.

FIG. 8 depicts a simplified high level diagram of the components in the error handling module 805, according to some embodiments. These components may be implemented in hardware, or software, or combinations thereof. The various components of the error handling module 805 depicted in FIG. 8 are meant for illustrative purposes only and are not intended to limit the scope of embodiments of the present invention. Alternative embodiments may include more or fewer modules than those shown in FIG. 8.

In one embodiment, error handling module 805 can receive error information 810 from cloud infrastructure system 100 (e.g., TAS module 204, SDI module 206, EM module 208).

In current implementations, error messages are sent to an administrator to handle. In contrast, error handling module 805 can receive error information 810, determine specific service associated with the error, determine classification type of error, and perform corrective actions based on specific service information 815 and error information 810.

In some instances, error handling module 805 filter can include an error category filter 806 that can filter and categorize each received error based on the category of the error. Error information 810 can be classified and filter into different categories. For example, the different categories can include: fatal errors; retry errors; or stalled errors.

A fatal error can occur when error handling module 805 cannot handle the error. In some instances, when a fatal error is received, error handling module 805 notifies an administrator of the fatal error. Fatal errors can be the most serious of errors and may require an administrator to handle the error.

A retry error can be retried by error handling module 805. Error handling module 805 can retry the provisioning of service when a retry error is received. In some instances, cloud infrastructure system 100 can determine why the process failed and by retrying the provisioning of the service, it may resolve the issue. For example, a module or application may be currently down, therefore error handling module can simply retrying the request for provisioning of the service. In another example, a BPEL orchestration engine in TAS helps with the provisioning of a service, therefore if the BPEL layer is not reachable for some reason, the error message can indicate that the BPEL layer is unreachable. Error handling module 805 can receive this error and use the error category filter 806 to determine that this error is a retry error. Error category filter 806 can have a list of errors that can be retried.

A stalled error can occur when processing the order for provisioning of a service takes longer than normal. In some instances, an order may be stalled, such as being stuck in the execution flow of provisioning operations. According to some embodiments, TAS module 204 can have a configuration parameter for each service that can determine when an order is stalled. A stalled error can be based on timing. For example, a database service should be provisioned within five minutes, but if the database service provisioning is taking two hours and the service is still is in a state of provisioning, then a stalled error can be sent. In one embodiment, error handling module 805 can assume that the provisioning of the database is stuck, and retry processing the order.

Additionally, the number of retries can be configurable for a given service. For example, the number of retries can be limited, and error handling module 805 can do another corrective action (e.g., alert administrator) after the retry limit has been reached. For a given service, error handling module can retry the order based on the total retry limit for each service. Furthermore, after a specified number of retries, error handling module 805 can sent an alert notification to an administrator based on an alert retry limit. The alert notification can alert the administrator that the order may be stalled. In some embodiments, the order continues to be retried until the total retry limit is reached. For example, an alert notification can be sent to an administrator after the third retry, and after the sixth retry, an administrator may need to make changes in the order so that the order processing is complete.

Once the number of retries has been reached, an notification can be sent to an administrator. In one embodiment the administrator can determine that the error is not a fatal error and reset the counter for number of retries. As a result, the administrator can restart the process again by resetting the retry count to zero.

In another example, a retry time limit can be based on timing. For example, the predetermined time for a time out (e.g., when the order is dumped) is two hours, then the error handling module 805 can set an alert time limit to one hour. Therefore, at the alert time (e.g., one hour) error handling module 805 can send an alert to an administrator to look at the order.

The retry limit, alert retry limit, retry time limit and alert time limit can be configurable based on the service being provisioned. Different services are provisioned differently, therefore each limit can be configurable per service. For example, a CRM service may take say 12 hours to be provisioned. Alternatively, a database service may only take five hours to be provisioned. Therefore, both of these services cannot have the same set of values. In some instances, over time the system administrators can update the configuration of these limits based on data from previous provisioned service.

Error handling module 805 can have multiple recovery mechanisms based on the error type and specific service information. Corrective actions include a retry or send an alert to administrator. The corrective actions are service specific. For example, a certain event can be a retry error for provisioning of a first service, but can be a fatal error for provisioning of a second service.

According to some embodiments, a JAVA error handler 820 can classify all possible errors for provisioning a JAVA service. Additionally, information such as, but not limited to, the time between retries, number of retries and what is the corrective action for each JAVA-specific error can be configured in JAVA error handler 820. JAVA error handler can be a plugin to error handling module 805. Using the error category filter 806, error handling module 805 can filter error information 810 and send the error message to the corresponding service-specific error handler 830.

For example, in provisioning a JAVA service the time between retries can be five minutes, while the time between retries for provisioning a database service can be three minutes. Therefore, the configuration of the database error handler 825 can be different than the JAVA error handler 820 because the corrective action is based on the service.

In some instances, error handling module can classify the error (e.g., the various failures) and use the appropriate corrective action to fix the error without the administrator having to manually look at the error. In some cases, an administrator may be needed, the have various alert mechanisms can simply the process of the fixing the error for the administrator.

Figure 9:
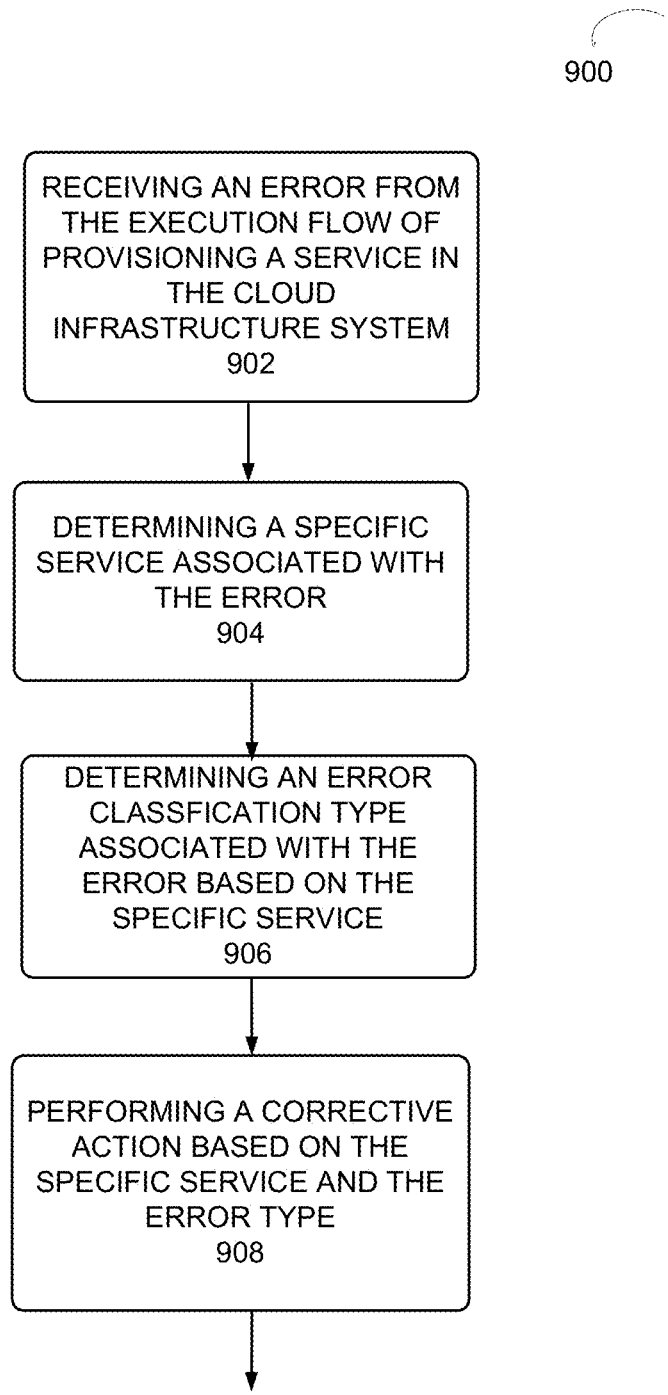
FIG. 9 depicts a simplified flowchart depicting processing that may be performed by the error handling module in the cloud infrastructure system, in accordance with an embodiment of the present invention.

In one embodiment, the components depicted in FIG. 8 perform the processing described in steps 902-908 discussed in FIG. 9.

FIG. 9 depicts a simplified flowchart depicting processing that may be performed by the error handling module 805 in the cloud infrastructure system, in accordance with an embodiment of the present invention. The processing 900 depicted in FIG. 9 may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 9 is not intended to be limiting.

At 902, error handling module 805 can receive an error from the execution flow of provisioning a service in the cloud infrastructure system. For example, during the processing and provisioning of an order for a service, in some instances, an error may occur. For example, if a process is terminated prematurely (e.g., during the process flow in the orchestration engine), error information associated with the premature termination can be sent to error handling module 805. The error can be sent to error handling module to determine a corrective action.

At 904, error handling module 805 can determine a specific service associated with the error. Examples of specific services can include, but may not be limited to, SaaS, PaaS, IaaS services.

At 906, error handling module 805 can determine an error classification type associated with the error based on the specific service. Examples of error classification types can include, but may not be limited to, fatal errors, retry errors or stalled errors.

At 908, error handling module 805 can perform a corrective action based on the specific service and the error classification type. Examples of corrective action can include, but may not be limited to, retry processing the order or send an alert to an administrator.

According to one embodiment, error handling module 805 can monitor the order processing after the initiated corrective action.

In addition to maintaining the order progress status, TAS module 204 can maintain detailed information about any failures encountered during process execution. Examples of errors can include that the BPEL node failed and the error messages associated with the failure.

Figure 10:
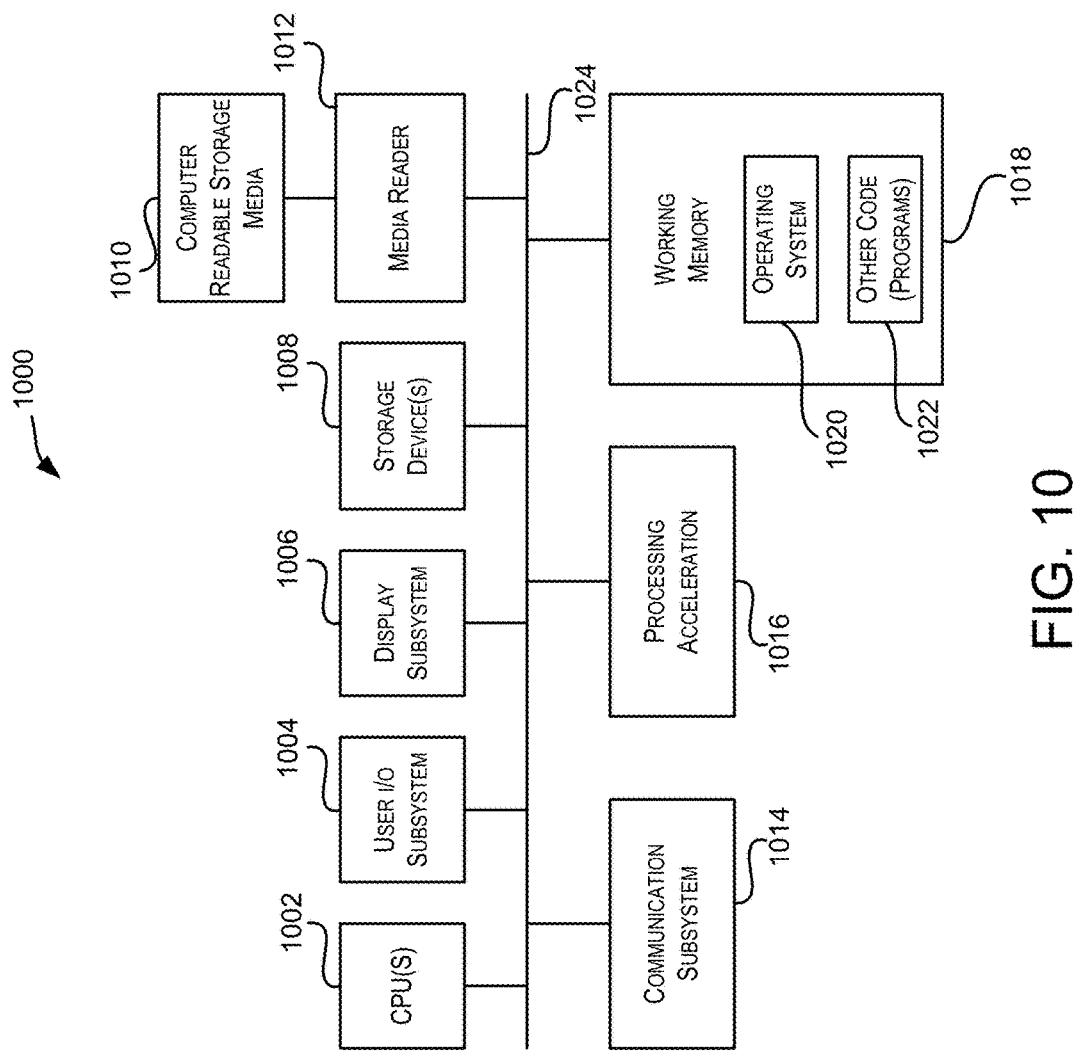
FIG. 10 is a simplified block diagram of a computing system that may be used in accordance with embodiments of the present invention.

According to one embodiment, error handling can be implemented using error message from SDI module 206. For example, a sdictl can be an executable file name. The sdictl can return the code of the commands that have been executed. In case of error, the error code and additional description can be returned. Error handling module 805 can use the CLI tool to debug, fix, and resume/cancel the erroneous provisioning request. Furthermore, in order to enable monitoring, SDI can provide a metric extension named "Request Error Notification Queue" to collect metrics. The metric extension can be a read only file. Each "Request Error Notification" can contain the following properties:

Id (Long)—The unique Notification ID
Request-Id (String)—The Request ID of the erroneous provisioning request
Fault-Type (String)—Fault error code
Fault-Message (String)—Fault message and stack trace
Fault-Timestamp (String)—Fault timestamp FIG. 10 is a simplified block diagram of a computing system 1000 that may be used in accordance with embodiments of the present invention. For example, cloud infrastructure system 100 may comprise one or more computing devices. System 1000 depicted in FIG. 10 may be an example of one such computing device. Computer system 1000 is shown comprising hardware elements that may be electrically coupled via a bus 1024. The components may include one or more processing units 1002, an input subsystem 1004, an output subsystem 1006, storage devices 1008, a computer-readable storage media reader 1012 connected to a computer-readable storage medium 1010, a communication subsystem 1014, a processing acceleration subsystem 1016, and working memory 1018.

Bus subsystem 1024 provides a mechanism for letting the various components and subsystems of computer system 1000 communicate with each other as intended. Although bus subsystem 1024 is shown schematically as a single bus, alternative embodiments of the bus subsystem may utilize multiple busses.

Input subsystem 1004 may include one or more input devices such as a mouse, a keyboard, a pointing device, a touchpad, etc. In general, input subsystem 1004 may include any device or mechanism for inputting information to computer system 1000.

Output subsystem 1006 may include one or more output devices for outputting information from computer system 1000. Examples of output devices include without limitation a display device, a printer, a projection device, etc. In general, output subsystem 1006 may include any device or mechanism for outputting information from computer system 1000.

Processing unit(s) 1002 can include one or more processors, one or more cores of processors, combinations thereof, and the like. In some embodiments, processing unit(s) 1002 can include a general purpose primary processor as well as one or more special purpose co-processors such as graphics processors, digital signal processors, or the like. In some embodiments, some or all processing units 1002 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1002 can execute instructions stored in working memory 1018 or on storage devices 1008. In various embodiments, processing units 1002 can execute a variety of programs or code instructions and can maintain multiple concurrently executing programs or processes. At any given time, some or all of the program code to be executed can be resident in system working memory 1018, storage devices 1008, and/or on computer-readable storage media 1010. Through suitable programming, processing units 1002 can provide various functionalities described above for performing event stream-related processing. In some embodiments, computer system 1000 may also include a processing acceleration unit 1016, which can include a digital signal processor (DSP), a special-purpose processor, and/or the like.

Storage device(s) 1008 may include memory devices such as disk drives, optical storage devices, and solid-state storage devices such as a random access memory (RAM) and/or a read-only memory (ROM), which can be programmable, flash-updateable and/or the like. Software (programs, code modules, instructions), which when executed by processing unit(s) 1002 to provide the functionality described above, may be stored on storage devices 1008. Storage devices 1008 may also provide a repository for storing data used in accordance with embodiments of the present invention.

Computer-readable storage media reader 1012 can further be connected to a computer-readable storage medium 1010, together (and, optionally, in combination with storage device(s) 1008) comprehensively representing remote, local, fixed, and/or removable memory storage devices plus storage media for temporarily and/or more permanently containing computer-readable information.

Communications subsystem 1014 may permit data to be exchanged with network and/or any other computers. Communication subsystem 1014 serves as an interface for receiving data from and transmitting data to other systems from computer system 1000. The communication may be provided using wired or wireless protocols. For example, communication subsystem 1014 may enable computer 1000 to connect to a client device via the Internet. Communication subsystem 1014 may comprise a modem, a network card (wireless or wired), an infra-red communication device, a GPS receiver, etc.

Working memory subsystem 1018 may include a number of memories including a main random access memory (RAM) for storage of instructions and data during program execution and a read only memory (ROM) in which fixed instructions are stored. Software elements such as an operating system 1020 and/or other code 1022, such as an application program (which may be a client application, Web browser, mid-tier application, RDBMS, etc.), may be stored in working memory 1018. In an exemplary embodiment, working memory 1018 may include executable code and associated data structures (such as caches) used for processing events and enabling variable duration windows processing as described above.

It should be appreciated that alternative embodiments of computer system 1000 may have more or less components with numerous variations from that described above. For example, customized hardware might also be used and/or particular elements might be implemented in hardware, software (including portable software, such as applets), or both. Further, connection to other computing devices such as network input/output devices may be employed.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:

storing, by a cloud infrastructure system, an error from provisioning a service from a plurality of services provided by the cloud infrastructure system, the cloud infrastructure system comprising one or more computing devices;

determining, by a computing device of the one or more computing devices, that the service associated with the error is a specific service, wherein the specific service includes a database cloud service, a Java cloud service, a middleware cloud service, a Customer Relationship Management (CRM) service, or a talent management service;

determining, by the computing device, an error classification type associated with the error based on the specific service, wherein the error classification type includes a fatal error, a retry error, and a stalled error;

selecting, by the computing device, a corrective action from a plurality of corrective actions based on the specific service and the error classification type, wherein the selected corrective action includes retrying provisioning of the service associated with the error, and wherein the computing device stores a retry counter that is incremented for each retrying provisioning of the service associated with the error, based on the selected corrective action including retrying provisioning of the service associated with the error;

determining, by the computing device, based on the specific service, a retry limit for retrying the provisioning of the service associated with the error, wherein the retry limit is associated with a maximum number of retries; and performing the selected corrective action.

2. The method of claim 1, wherein, based on the error classification type associated with the error being the stalled error, the selected corrective action includes delaying provisioning of the service associated with the error.

3. The method of claim 1, further comprising:
sending, by the computing device, a notification about the error, upon determining that the error classification type is the fatal error.

4. The method of claim 1, wherein the computing device stops retrying provisioning of the service associated with the error when the retry counter equals the retry limit.

5. The method of claim 1, further comprising:
determining, by the computing device, an alert limit based on the specific service determined for the service associated with the error and the retry limit, wherein an alert notification is sent when the retry counter equals the alert limit.

6. The method of claim 1, further comprising:
determining, by the computing device, a time duration between retries of provisioning of the service associated with the error, wherein the time duration is determined based on the specific service determined for the service associated with the error.

7. The method of claim 1, wherein an attribute associated with performing the corrective action is determined based on the specific service determined for the service associated with the error, and wherein the corrective action is performed based on a value of the attribute.

8. The method of claim 1, further comprising:
upon determining that the service associated with the error is a first service in the plurality of services, performing the corrective action according to a first value of an attribute associated with the corrective action, the first value being associated with the first service; and
upon determining that the service associated with the error is a second service in the plurality of services, performing the corrective action according to a second value of the attribute associated with the corrective action, the second value being associated with the second service.

9. The method of claim 1, further comprising:
determining, by the computing device, a threshold for the corrective action based on the specific service determined for the service associated with the error, wherein the corrective action is retrying provisioning of the service, and wherein the corrective action is performed until the threshold is satisfied.

10. The method of claim 9, further comprising:
preventing the corrective action from being performed upon determining that the threshold is satisfied.

11. The method of claim 1, wherein the selected corrective action is a first corrective action; and
the method further comprises:
selecting a second corrective action from the plurality of corrective actions based on the specific service and the error classification type, wherein the second corrective action is different than the first corrective action; and
performing the second corrective action.

12. A system comprising:
one or more computing devices configured to offer a set of services; and
memory configured to store an error from provisioning a service from the set of services; and
wherein a computing device of the one or more computing devices is configured to:
determine that the service associated with the error is a specific service associated with the error, wherein the specific service includes a database cloud service, a Java cloud service, a middleware cloud service, a Customer Relationship Management (CRM) service, or a talent management service;
determine an error classification type associated with the error based on the specific service, wherein the error classification type includes a fatal error, a retry error, and a stalled error;
select a corrective action from a plurality of corrective actions based on the specific service and the error classification type, wherein the selected corrective action includes retrying provisioning of the service associated with the error, and wherein the computing device stores a retry counter that is incremented for each retrying provisioning of the service associated with the error, based on the selected corrective action including retrying provisioning of the service associated with the error;
determine, based on the determined specific service, a retry limit for retrying the provisioning of the service associated with the error, wherein the retry limit is associated with a maximum number of retries; and
perform the selected corrective action.

13. The system of claim 12, wherein the computing device is further configured to:
retry provisioning the service associated with the error, based on determining that the error classification type being the stalled error.

14. The system of claim 12, wherein the computing device is further configured to:
stop the retries for provisioning of the service associated with the error when the retry counter equals the retry limit.

15. The system of claim 12, wherein the computing device is further configured to determine an alert limit based on the determined specific service determined for the services associated with the error and the retry limit, and wherein an alert notification is sent when the retry counter equals the alert limit.

16. The system of claim 12, wherein the computing device is further configured to:
determine a time duration between retries of provisioning of the service associated with the error, wherein the time duration is determined based on the specific service determined for the service associated with the error.

17. One or more computer-readable media storing computer-executable instructions which, when executed by one or more computing devices, cause the one or more computing devices to:
- store an error from provisioning a service from a set of services provided by a cloud infrastructure system;
- determine that the service associated with the error is a specific service, wherein the specific service includes a database cloud service, a Java cloud service, a middleware cloud service, a Customer Relationship Management (CRM) service, or a talent management service;
- determine an error classification type associated with the error based on the specific service, wherein the error classification type includes a fatal error, a retry error, and a stalled error;
- select a corrective action from a plurality of corrective actions based on the specific service and the error classification type, wherein the selected corrective action includes retrying provisioning of the service associated with the error, and; wherein the computing device stores a retry counter that is incremented for each retrying provisioning of the service associated with the error, based on the selected corrective action including retrying provisioning of the service associated with the error;
- determine, based on the specific service, a retry limit for retrying the provisioning of the service associated with the error, wherein the retry limit is associated with a maximum number of retries; and
- perform the selected corrective action.

18. The one or more computer-readable media of claim 17, wherein the computer-executable instructions, when executed by the one or more computing devices, further cause the one or more computing devices to:
- stop the retries for provisioning of the service associated with the error when the retry counter equals the retry limit.

19. The one or more computer-readable media of claim 17, wherein the computer-executable instructions, when executed by the one or more computing devices, further cause the one or more computing devices to:
- determine an alert limit based on the specific service determined for the service associated with the error and the retry limit, wherein an alert notification is sent when the retry counter equals the alert limit.

20. The one or more computer-readable media of claim 17, wherein the computer-executable instructions, when executed by the one or more computing devices, further cause the one or more computing devices to:
- determine a time duration between retries of provisioning of the service associated with the error, wherein the time duration is determined based on the specific service determined for the service associated with the error.

21. The one or more computer-readable media of claim 17, wherein a corrective action of the plurality of corrective actions includes sending a message associated with the error, and retrying provisioning of the service associated with the error.

* * * * *

UNITED STATES PATENT AND TRADEMARK OFFICE
CERTIFICATE OF CORRECTION

PATENT NO. : 9,667,470 B2  
APPLICATION NO. : 13/907652  
DATED : May 30, 2017  
INVENTOR(S) : Prathipati et al.

Page 1 of 1

It is certified that error appears in the above-identified patent and that said Letters Patent is hereby corrected as shown below:

On the Title Page

On page 4, Column 1, item [56], under Other Publications, Line 29, delete "Service" and insert -- Server --, therefor.

On page 5, Column 2, item [56], under Other Publications, Line 32, delete "Catacylsm" and insert -- Cataclysm --, therefor.

In the Drawings

Drawing sheet 15 of 16, FIG. 9, under Reference Numeral 906, Line 2, delete "CLASSFICATION" and insert -- CLASSIFICATION --, therefor.

In the Specification

Column 1, Line 9, delete "119(e)" and insert -- §119(e) --, therefor.

Signed and Sealed this  
Fourteenth Day of August, 2018

Andrei Iancu  
*Director of the United States Patent and Trademark Office*